US012633760B2

(12) United States Patent
Jin et al.

(10) Patent No.: US 12,633,760 B2
(45) Date of Patent: May 19, 2026

(54) METHOD FOR TRANSMITTING INFORMATION ABOUT CHARGING STATE OF AUDIO OUTPUT DEVICE, AND AUDIO OUTPUT DEVICE THEREOF

(71) Applicant: Samsung Electronics Co., Ltd., Suwon-si (KR)

(72) Inventors: Juyeon Jin, Suwon-si (KR); Gupil Cheong, Suwon-si (KR); Byoungchul Lee, Suwon-si (KR); Jaewoo Choi, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 765 days.

(21) Appl. No.: 18/167,440

(22) Filed: Feb. 10, 2023

(65) Prior Publication Data

US 2023/0187948 A1     Jun. 15, 2023

Related U.S. Application Data

(63) Continuation of application No. PCT/KR2021/011024, filed on Aug. 19, 2021.

(30) Foreign Application Priority Data

Aug. 19, 2020     (KR) ........................ 10-2020-0103981

(51) Int. Cl.
*H01M 10/44*          (2006.01)
*H01M 10/46*          (2006.01)
(Continued)

(52) U.S. Cl.
CPC ........ *H02J 7/00034* (2020.01); *H04R 1/1025* (2013.01)

(58) Field of Classification Search
CPC .... H02J 7/0048; H02J 7/0047; H02J 7/00034; H02J 50/80; H04R 1/1016; H04R 1/1041;
(Continued)

(56) References Cited

U.S. PATENT DOCUMENTS 9,949,015 B1 *    4/2018   Minoo ................... H02J 7/0044
10,042,595 B2    8/2018   Behzadi et al.
(Continued)

FOREIGN PATENT DOCUMENTS

CN          207884842 U       9/2018
JP           6550607 B1        7/2019
(Continued)

OTHER PUBLICATIONS

Korean Notice of Allowance dated Jun. 23, 2025, issued in Korean Patent Application No. 10-2020-0103981.
(Continued)

*Primary Examiner* — Edward Tso
(74) *Attorney, Agent, or Firm* — Jefferson IP Law, LLP

(57)          ABSTRACT

An audio output device is provided. The audio output device includes a battery, a wireless communication circuit, and a control circuit electrically connected to the battery and the wireless communication circuit, wherein the control circuit releases a communication connection with an electronic device using the wireless communication circuit if an electrical connection between the audio output device and a power supply device is sensed, starts charging of the battery of the audio output device by using the power supplied from the power supply device, temporarily activates the wireless communication circuit if either a residual battery quantity of the audio output device or a residual battery quantity of the power supply device satisfies a designated charging condition during charging of the battery of the audio output device, and transmits information about the charging state of
(Continued)

the audio output device or the power supply device to the electronic device.

15 Claims, 14 Drawing Sheets

(51) Int. Cl.
   *H02J 7/00* (2006.01)
   *H04R 1/1025* (2026.01)

(58) Field of Classification Search
   CPC ............. H04R 1/1025; H04R 2420/07; H04M 1/6066; H04M 1/60; Y10S 320/18
   USPC ......... 320/107, 114, 115, 132, 149, DIG. 18, 320/DIG. 21
   See application file for complete search history.

(56) References Cited

U.S. PATENT DOCUMENTS

| | | | |
|---|---|---|---|
| 10,090,697 B2 | 10/2018 | Kwon et al. | |
| 10,129,626 B1 | 11/2018 | Jung et al. | |
| 10,506,324 B2 | 12/2019 | Minoo et al. | |
| 11,140,486 B2 | 10/2021 | Bae et al. | |
| 2015/0373448 A1 | 12/2015 | Shaffer | |
| 2016/0057803 A1* | 2/2016 | Kim ................. | H04W 52/0209 370/329 |
| 2017/0094392 A1 | 3/2017 | Zorkendorfer et al. | |
| 2017/0094394 A1 | 3/2017 | McPeak et al. | |
| 2017/0094399 A1 | 3/2017 | Chandramohan et al. | |
| 2017/0164089 A1 | 6/2017 | Lee et al. | |
| 2017/0289668 A1 | 10/2017 | Kim | |
| 2018/0248414 A1 | 8/2018 | Liu et al. | |
| 2019/0081499 A1 | 3/2019 | Sun et al. | |
| 2019/0140469 A1 | 5/2019 | Lee | |
| 2019/0281437 A1 | 9/2019 | Watson et al. | |
| 2019/0334360 A1 | 10/2019 | Colosimo et al. | |
| 2020/0107174 A1 | 4/2020 | Tong et al. | |
| 2020/0186909 A1 | 6/2020 | Shen | |
| 2020/0220367 A1 | 7/2020 | Cho et al. | |
| 2020/0336820 A1 | 10/2020 | Tasaka | |

FOREIGN PATENT DOCUMENTS

| | | |
|---|---|---|
| JP | 2020-108223 A | 7/2020 |
| KR | 10-2014-0115898 A | 10/2014 |
| KR | 10-2017-0067050 A | 6/2017 |
| KR | 10-2017-0127885 A | 11/2017 |
| KR | 10-1885734 B1 | 9/2018 |
| KR | 10-2019-0022883 A | 3/2019 |
| KR | 10-2019-0047776 A | 5/2019 |
| KR | 10-2019-0061681 A | 6/2019 |
| KR | 10-2071268 B1 | 1/2020 |
| KR | 10-2020-0079461 A | 7/2020 |
| KR | 10-2020-0085453 A | 7/2020 |
| WO | 2018/048510 A1 | 3/2018 |

OTHER PUBLICATIONS

International Search Report dated Dec. 10, 2021, issued in International Application No. PCT/KR2021/011024.

\* cited by examiner

MOBILE/TABLET/PC/ETC

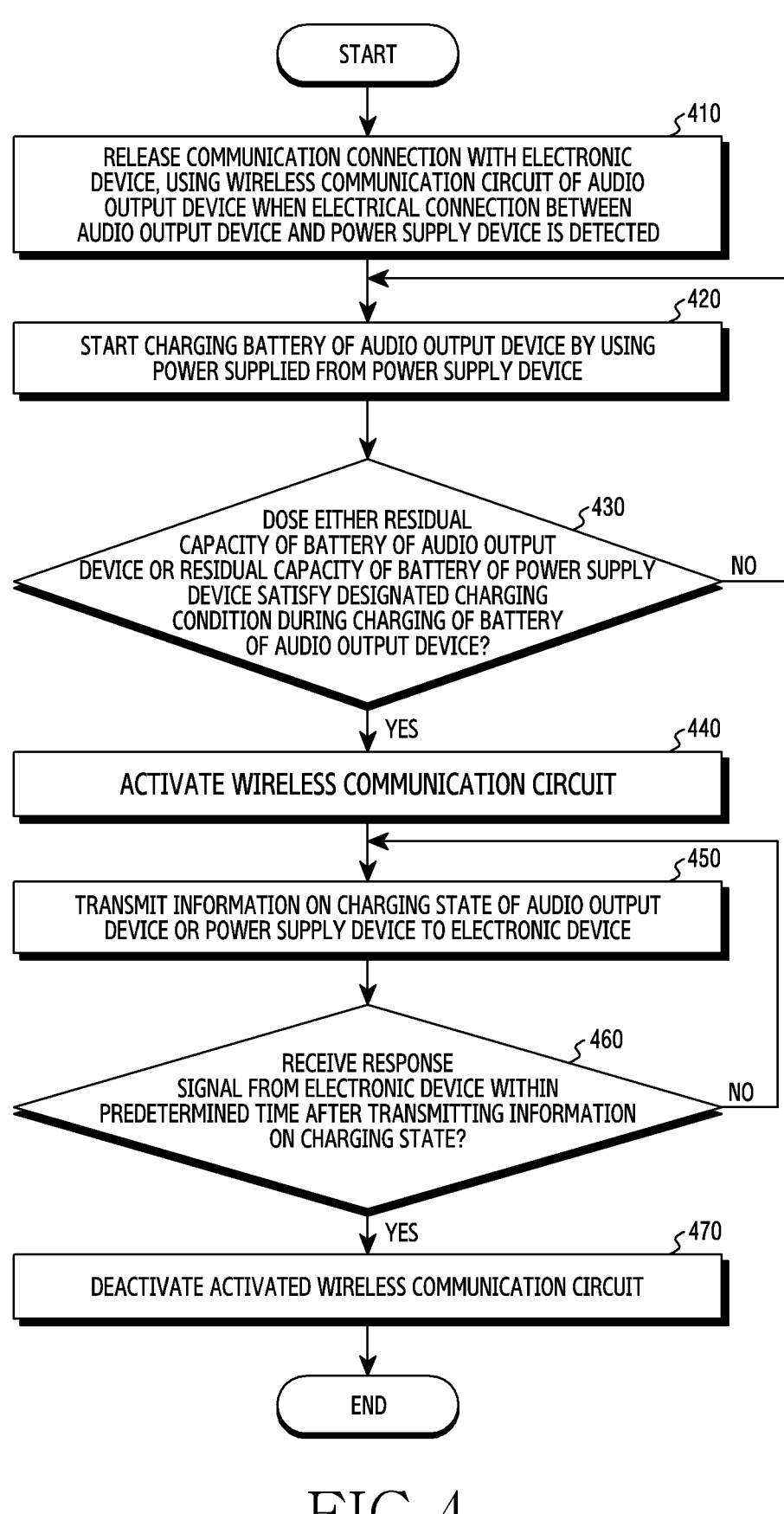

START

410 RELEASE COMMUNICATION CONNECTION WITH ELECTRONIC DEVICE, USING WIRELESS COMMUNICATION CIRCUIT OF AUDIO OUTPUT DEVICE WHEN ELECTRICAL CONNECTION BETWEEN AUDIO OUTPUT DEVICE AND POWER SUPPLY DEVICE IS DETECTED

420 START CHARGING BATTERY OF AUDIO OUTPUT DEVICE BY USING POWER SUPPLIED FROM POWER SUPPLY DEVICE

430 DOSE EITHER RESIDUAL CAPACITY OF BATTERY OF AUDIO OUTPUT DEVICE OR RESIDUAL CAPACITY OF BATTERY OF POWER SUPPLY DEVICE SATISFY DESIGNATED CHARGING CONDITION DURING CHARGING OF BATTERY OF AUDIO OUTPUT DEVICE? — NO

YES

440 ACTIVATE WIRELESS COMMUNICATION CIRCUIT

450 TRANSMIT INFORMATION ON CHARGING STATE OF AUDIO OUTPUT DEVICE OR POWER SUPPLY DEVICE TO ELECTRONIC DEVICE

460 RECEIVE RESPONSE SIGNAL FROM ELECTRONIC DEVICE WITHIN PREDETERMINED TIME AFTER TRANSMITTING INFORMATION ON CHARGING STATE? — NO

YES

470 DEACTIVATE ACTIVATED WIRELESS COMMUNICATION CIRCUIT

END

METHOD FOR TRANSMITTING INFORMATION ABOUT CHARGING STATE OF AUDIO OUTPUT DEVICE, AND AUDIO OUTPUT DEVICE THEREOF

CROSS-REFERENCE TO RELATED APPLICATION(S)

This application is a continuation application, claiming priority under § 365(c), of an International application No. PCT/KR2021/011024, filed on Aug. 19, 2021, which is based on and claims the benefit of a Korean patent application number 10-2020-0103981, filed on Aug. 19, 2020, in the Korean Intellectual Property Office, the disclosure of which is incorporated by reference herein in its entirety.

BACKGROUND

1. Field

The disclosure relates to an audio output device. More particularly, the disclosure relates to an audio output device and method for transmitting information on a charging state to an electronic device.

2. Description of Related Art

With the development of technology, various electronic devices that output audio, based on data received through wireless communication, are being developed. Such an audio output device may receive data through a Bluetooth communication connection with an electronic device (e.g., a smartphone, a tablet, a laptop computer, a personal computer (PC), a portable electronic device, and the like). Accordingly, the audio output device may be referred to as a Bluetooth earphone. Bluetooth earphones, unlike existing wired earphones, provide convenience for users to do activities, and recently, the number of users using Bluetooth earphones is increasing.

Generally, most of the early Bluetooth earphones were mono type earphones worn in only one ear and neckband type earphones including a connection part connecting earphone units so as to be worn on the back of the user's neck. However, recently, cordless Bluetooth earphones, in which a wire of earphone is completely removed, occupy the highest position in the Bluetooth earphone industry.

A cordless Bluetooth earphone includes no wire for connecting an electronic device and an earphone unit and thus is advantageous in that a user wearing the same may freely engage in activities. A cordless earphone unit (i.e., the cordless Bluetooth earphone) may include a separate battery and may be driven using power charged in the battery.

Meanwhile, as a size of earphone is reduced, the volume of a battery of the earphone has also been reduced so that users do not experience discomfort even if the users wear the earphone for a long time. In order to compensate for the short duration of a battery, the cordless Bluetooth earphone may be provided with a separate charging case capable of charging and storing the battery thereof.

The above information is presented as background information only to assist with an understanding of the disclosure. No determination has been made, and no assertion is made, as to whether any of the above might be applicable as prior art with regard to the disclosure.

SUMMARY

When a Bluetooth earphone is worn on a user's body, the Bluetooth earphone may establish a Bluetooth communication connection with an electronic device to perform various functions (e.g., sound output) installed therein. When the Bluetooth earphone is accommodated in a power supply device (e.g., a charging case or a charging accessory), the Bluetooth earphone may determine that the Bluetooth earphone is not in use and thus release the Bluetooth communication connection with the electronic device. However, due to this, after the Bluetooth earphone is inserted into the power supply device, a user may not identify the battery states of the Bluetooth earphone and the power supply device by the electronic device. Thus, after Bluetooth communication connection with the electronic device is released, even when a problem occurs in charging the Bluetooth earphone, the user of the electronic device may have difficulty in immediately recognizing the problem.

In a state where the Bluetooth earphone has been inserted into the power supply, a charge rate of the Bluetooth earphone may be displayed through a light emitting diode (LED) of a case. In this state, a user needs to directly identify a color or blinking of the LED. Thus, the charge rate may be identified only when the power supply device is within a visible distance. In addition, the user may have difficulty in determining whether the battery has reached a specific charge rate because the exact charge rate of the Bluetooth earphone may not be identified even when the power supply is within a visual distance.

Aspects of the disclosure are to address at least the above-mentioned problems and/or disadvantages and to provide at least the advantages described below. Accordingly, an aspect of the disclosure is to provide an audio output device enabling a user to identify information on a charging state of the Bluetooth earphone and the power supply device by an electronic device even when the Bluetooth earphone is accommodated in the power supply device.

Additional aspects will be set forth in part in the description which follows and, in part, will be apparent from the description, or may be learned by practice of the presented embodiments.

In accordance with an aspect of the disclosure, an audio output device is provided. The audio output device includes a battery, a wireless communication circuit, and a control circuit electrically connected to the battery and the wireless communication circuit, wherein the control circuit, when an electrical connection between the audio output device and a power supply device is detected, releases a communication connection with an electronic device, using the wireless communication circuit, and starts charging of the battery of the audio output device by using the power supplied from the power supply device, and, when either a battery residual capacity of the audio output device or a battery residual capacity of the power supply device satisfies a designated charging condition during charging of the battery of the audio output device, activates the wireless communication circuit, and transmits information on the charging state of the audio output device or the power supply device to the electronic device through the wireless communication circuit.

In accordance with another aspect of the disclosure, a method for transmitting information on a charging state of an audio output device is provided. The method includes, in case that an electrical connection between the audio output device and a power supply device is detected: releasing a communication connection with an electronic device, using a wireless communication circuit, and starting charging a battery of the audio output device by using power supplied from the power supply device, and, in case that either a battery residual capacity of the audio output device or a battery residual capacity of the power supply device satisfies a designated charging condition during charging of the battery of the audio output device: temporarily activating the wireless communication circuit, and transmitting information on a charging state of the audio output device or the power supply device to the electronic device through the wireless communication circuit.

In accordance with another aspect of the disclosure, an audio system including an audio output device and a power supply device is provided. The audio output device includes a battery, a wireless communication circuit, and a control circuit electrically connected to the battery and the wireless communication circuit, wherein the control circuit, while the audio output device is mounted on the power supply device and the battery of the audio output device is being charged, activates the wireless communication circuit when the charging satisfies a designated time condition or a battery residual capacity of the audio output device or the power supply device satisfies a designated charging condition, transmits information on a charging state of the audio output device or the power supply device to an electronic device through the wireless communication circuit, and deactivates the activated wireless communication circuit after transmitting the information on the charging state.

According to various embodiments disclosed herein, when either a battery residual capacity of an audio output device or a battery residual capacity of a power supply unit satisfies a designated charging condition during battery charging, the audio output device may activate a wireless communication circuit to transmit information on a charging state of the audio output device or the power supply to an electronic device.

According to various embodiments herein, when a response signal is received from an electronic device within a predetermined time after transmitting information on the charging state, the audio output device may deactivate the activated wireless communication circuit to reduce power consumed in communication connection.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flowchart illustrating a method for transmitting information on a charging state of an audio output device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
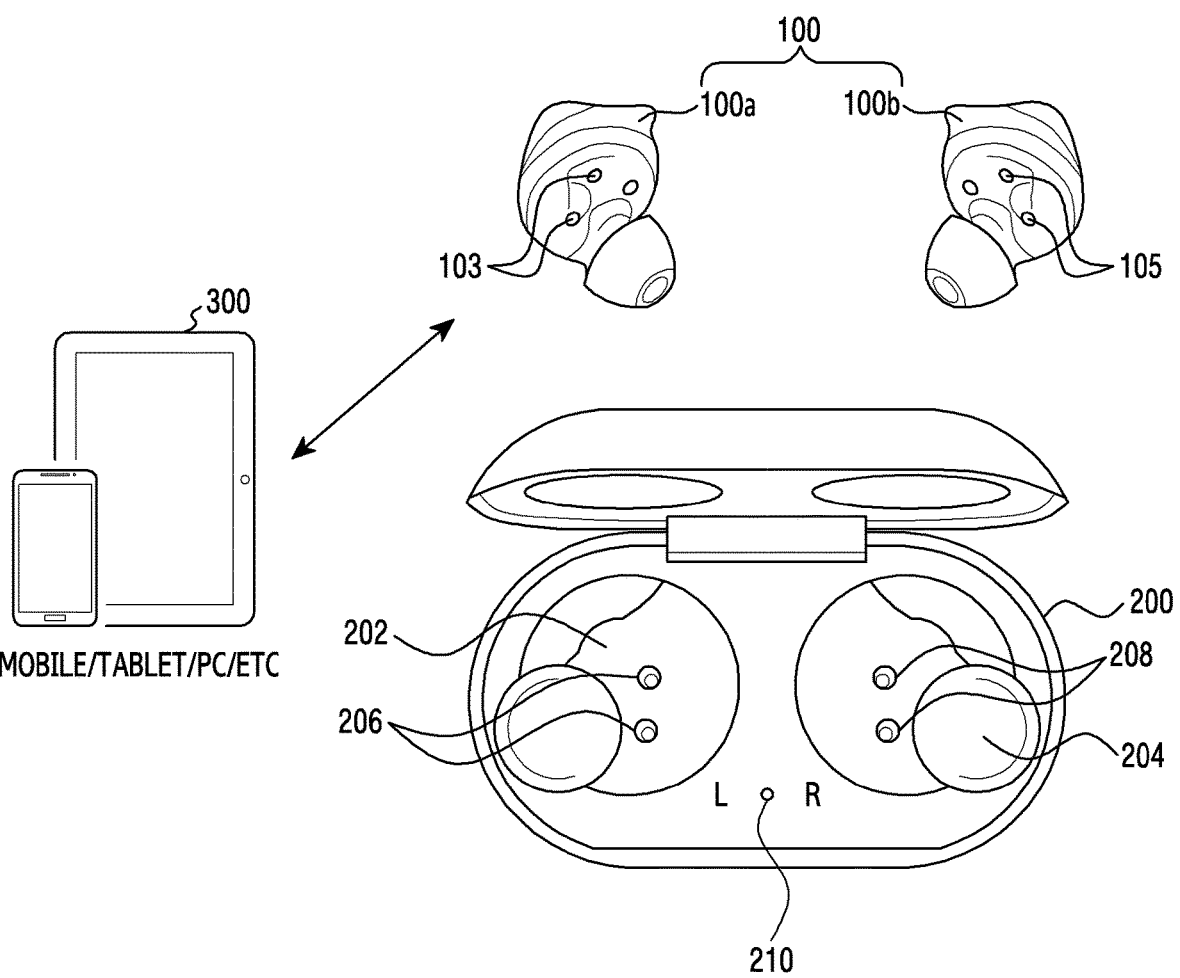
FIG. 1 is a view illustrating an electronic device and an audio system including an audio output device and a power supply device according to an embodiment of the disclosure.

FIG. 1 is a diagram illustrating an electronic device 300 and an audio system including an audio output device 100 and a power supply device 200 according to an embodiment of the disclosure.

According to an embodiment, when an audio output device 100 is not in use, the audio output device 100 may be accommodated and stored in a power supply device 200. When the audio output device 100 is in use, the audio output device 100 may be worn on a part (e.g., an ear) of a user's body. According to another embodiment, the audio output device 100 may be configured as a pair to be worn on both ears of a user. For example, the audio output device 100 may include a first audio output device 100a that may be worn on a user's right ear and a second audio output device 100b that may be worn on a user's left ear.

Referring to FIG. 1, the power supply device 200 may include a first accommodation part 202 in which the first audio output device 100a may be disposed and a second accommodation part 204 in which the second audio output device 100b may be disposed. In an embodiment, a first interface 206 including at least one terminal may be disposed on the bottom surface of the first accommodation part 202, and a second interface 208 including at least one terminal may be disposed on the bottom surface of the second accommodation part 204.

In one embodiment, the first interface 206 and the second interface 208 may include a pogo pin. In another embodiment, the first interface 206 and the second interface 208 may include at least one of a charging power terminal, a ground (GND) terminal, a detect terminal, or a data communication terminal. At least one terminal of the first interface 206 and the second interface 208 may be arranged to be in physical contact with at least one terminal of the audio output device 100 while the audio output device 100 is accommodated in the power supply device 200.

In yet another embodiment, at least one terminal of the first interface 206 and the second interface 208 may perform at least one function of functions of the charging power terminal, the detect terminal, and the data communication terminal. For example, one terminal included in the first interface 206 may detect that the first audio output device 100a is placed in the first accommodation part 202, charge the first audio output device 100a, and/or perform data communication with the first audio output device 100a. In another example, one terminal included in the second interface 208 may detect that the second audio output device 100b is placed in the second accommodation part 204, charge the second audio output device 100b, and/or perform data communication with the second audio output device 100b.

In one embodiment, the power supply device 200 may include at least one LED indicator 210. In an embodiment, the LED indicator 210 may output a signal when the first audio output device 100a or the second audio output device 100b is disposed in the at least one accommodation part of the first accommodation part 202 or the second accommodation part 204. When the first audio output device 100a is disposed in the first accommodation part 202, the LED indicator 210 may output a signal (e.g., green light or red light) indicating the charging state (e.g., fully charged or being charged) of the first audio output device 100a.

In another embodiment, the first audio output device 100a may receive power supplied from the power supply device 200 through the first interface 103. In yet another embodiment, the second audio output device 100b may receive power supplied from the power supply device 200 through the second interface 105. The first audio output device 100a may transmit data to the power supply device 200 through the first interface 103, and the second audio output device 100b may transmit data to the power supply device 200 through the second interface 105. For example, the first audio output device 100a may transmit information including battery residual capacity information of the first audio output device 100a to the power supply device 200.

According to an embodiment, the first audio output device 100a may transmit and receive data to and from the power supply device 200 through the first interface 103, and the second audio output device 100b may transmit and receive data to and from the power supply device 200 through the second interface 105. The first audio output device 100a may receive information including battery residual capacity information of the second audio output device 100b and/or battery residual capacity information of the power supply device 200 from the power supply device 200. In an embodiment, the second audio output device 100b may receive information including battery residual capacity information of the first audio output device 100a and/or battery residual capacity information of the power supply device 200 from the power supply device 200. For another example, the first audio output device 100a and/or the second audio output device 100b may transmit/receive information including battery residual capacity information to/from each other by using a communication connection between the first audio output device 100a and the second audio output device 100b.

In another embodiment, the audio output device 100 may output audio while being worn on the user's body. According to yet another embodiment, at least one of the first audio output device 100a and the second audio output device 100b may output audio by using wireless data transmission/reception with the electronic device 300. For example, a path of the wireless data transmission/reception may include at least one of path for a Bluetooth communication scheme, a path for a Bluetooth low energy communication scheme (BLE), a path for a wireless fidelity (Wi-Fi) direct communication scheme, and a path for a mobile communication scheme (e.g., long-term evolution (LTE) and sidelink).

In still another embodiment, only one of the pair of audio output devices 100a and 100b may generate the communication path with the electronic device 300. For example, the electronic device 300 may be connected to the first audio output device 100a of the pair of audio output devices 100a and 100b. When the electronic device 300 is connected to the first audio output device 100a, the electronic device 300 or the first audio output device 100a may provide information on the communication path to the second audio output device 100b to allow the second audio output device 100b to output the audio. In an embodiment, the second audio output device 100b may receive or sniff data transmitted to the first audio output device 100a, based on the information on the communication path and output the audio. According to another embodiment, the first audio output device 100a connected to the electronic device 300 may be referred to as a master device or a main audio output device, and the second audio output device 100b which is not connected to the electronic device 300 may be referred to as a slave device or a sub audio output device.

According to yet another embodiment, the first audio output device 100a and/or the second audio output device 100b may perform communication with the electronic device 300 by using a true wireless stereo (TWS), TWS+, or AoBLE communication method. For example, in the case of using the TWS communication method, communication may be performed between the first audio output device 100*a* and the second audio output device 100*b* to collect information, and one of the first audio output device 100*a* and the second audio output device 100*b* may communicate with the electronic device 300 to transfer the collected information. In the case of using the TWS+ or AoBLE communication method, the first audio output device 100*a* and the second audio output device 100*b* may each communicate with the electronic device 300 to transfer information.

In an embodiment, when the first audio output device 100*a* and/or the second audio output device 100*b* communicate with the electronic device 300, the electronic device 300 may be a master device, and the first audio output device 100*a* and/or the second audio output device 100*b* may be slave devices. In another embodiment, when communication is performed between the first audio output device 100*a* and the second audio output device 100*b*, among the first audio output device 100*a* and/or the second audio output device 100*b*, one may be a master device and the other may be a slave device. In yet another embodiment, when communication is performed between the first audio output device 100*a* and the second audio output device 100*b*, the configuration regarding a role of the first audio output device 100*a* and the second audio output device 100*b* among the master device and the slave device may be changed based on a designated condition. When the first audio output device 100*a* and the second audio output device 100*b* are taken out of the power supply device 200 at the same time, the first audio output device 100*a* to be wearable on the right side may correspond to the master device, and the second audio output device 100*b* to be wearable on the left side may correspond to the slave device. For another example, when only the second audio output device 100*b* is taken out of the power supply device 200, the second audio output device 100*b* may correspond to the master device. However, the embodiment is not limited thereto, and the roles of the master device and the slave device of the first audio output device 100*a* and the second audio output device 100*b* may be fixed. The role of the master device and the slave device of the first audio output device 100*a* and the second audio output device 100*b* may be designated by a designer, and may not be changed after once designated.

In still another embodiment, a device corresponding to a master device among the audio output devices 100 may serve to transmit data generated by the audio output device 100 to the electronic device 300. The master device serves to transmit a response signal to data transmitted by the electronic device 300 to the audio output device 100, transmit data (e.g., audio data obtained through a microphone or a sensor value acquired through a sensor) generated by the audio output device 100, and/or transmit state information (e.g., battery residual capacity) of the audio output device 100.

Figure 2:
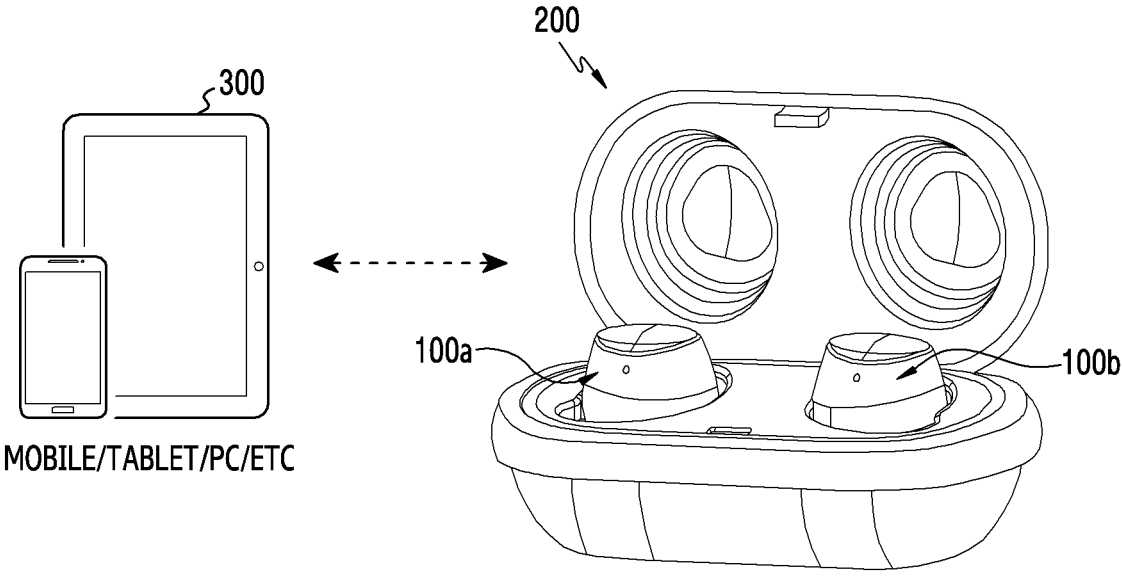
FIG. 2 is a view illustrating an electronic device and an audio output device accommodated in a power supply device according to an embodiment of the disclosure.

FIG. 2 is a view illustrating the electronic device 300 and the audio output device 100 accommodated in the power supply device 200 according to an embodiment of the disclosure.

Referring to FIG. 2, a power supply device 200 may have a structure that may be opened and closed, and an audio output device 100 may be accommodated in a recess formed in the power supply device 200 while the power supply device 200 is opened. In an example, the audio output device 100 may be accommodated such that at least a portion thereof is stably seated in the recess of the power supply device 200.

In an embodiment, although not shown, the audio output device 100 may include a member for being sensed, corresponding to a sensor of the power supply device 200. For example, the power supply device 200 may include a Hall sensor (or Hall IC), and the audio output device 100 may include a magnet. When the audio output device 100 is accommodated in the power supply device 200, the Hall sensor of the power supply device 200 may recognize a state in which the audio output device 100 is accommodated in the power supply device 200 and may transfer the recognized state to the audio output device 100. In another example, the audio output device 100 may include a Hall sensor, and the audio output device 100 may directly detect using the Hall sensor that the lid of the power supply device 200 is closed. The power supply device 200 may also control the audio output device 100 by detecting the accommodation of the audio output device 100 in the power supply device 200 and the closing of the lid of the power supply device 200, and the audio output device 100 may also control itself by detecting the closing of the lid of the power supply device 200 by using a Hall sensor.

In another embodiment, when the power supply device 200 recognizes that the audio output device 100 is accommodated inside the power supply device 200, through the Hall sensor (or Hall IC), the power supply device 200 may supply power to the audio output device 100 through the interface (e.g., the first interface 206 and/or the second interface 208). The audio output device 100 may recognize that the audio output device 100 is accommodated inside the power supply device 200, based on the reception of power through the interface (e.g., the first interface 103 and/or the second interface 105) from the power supply device 200.

In yet another embodiment, the power supply device 200 may receive state information (e.g., battery residual capacity) of the audio output device 100 through communication with the audio output device 100 (e.g., power line communication (PLC) communication), and control the charging of the audio output device 100, based on the state information (e.g., battery residual capacity) of the audio output device 100. When the difference between the state information (e.g., battery residual capacity) of the first audio output device 100*a* and the second audio output device 100*b* exceeds a designated threshold value, the power supply device 200 may perform charging control to substantially equalize the battery residual quantities of the first audio output device 100*a* and the second audio output device 100*b*.

Figure 3A:
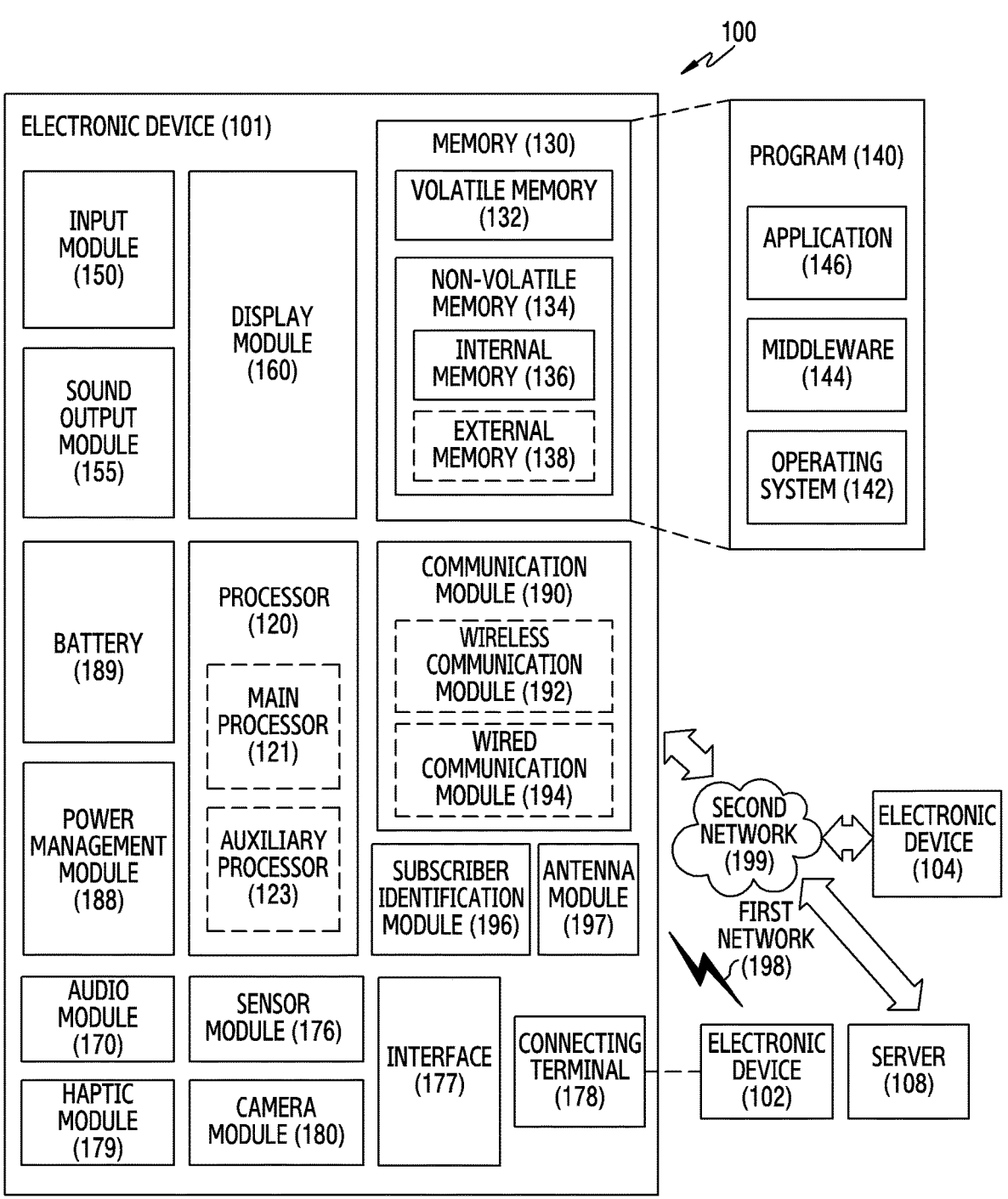
FIG. 3A is a block diagram of an electronic device in a network environment according to an embodiment of the disclosure.

FIG. 3A is a block diagram illustrating an electronic device in a network environment according to an embodiment of the disclosure.

Referring to FIG. 3A, an electronic device 300 in a network environment may communicate with an electronic device 102 via a first network 198 (e.g., a short-range wireless communication network), or an electronic device 104 or a server 108 via a second network 199 (e.g., a long-range wireless communication network). In an embodiment, the electronic device 300 may communicate with the electronic device 104 via the server 108. In another embodiment, the electronic device 300 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 300, or one or more other components may be added in the electronic device 300. In other embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 300 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, a communication processor (CP), and the like) that is operable independently from, or in conjunction with, the main processor 121. When the electronic device 300 includes the main processor 121 and the auxiliary processor 123, the auxiliary processor 123 may be adapted to consume less power than the main processor 121, or to be specific to a specified function. In an embodiment, the auxiliary processor 123 may be implemented as separate from, or as part of the main processor 121.

In an embodiment, the auxiliary processor 123 may control at least some of functions or states related to at least one component (e.g., the display module 160, the sensor module 176, or the communication module 190) among the components of the electronic device 300, instead of the main processor 121 while the main processor 121 is in an inactive (e.g., sleep) state, or together with the main processor 121 while the main processor 121 is in an active state (e.g., executing an application). According to another embodiment, the auxiliary processor 123 (e.g., an image signal processor or a communication processor) may be implemented as part of another component (e.g., the camera module 180 or the communication module 190) functionally related to the auxiliary processor 123. According to yet another embodiment, the auxiliary processor 123 (e.g., the neural processing unit) may include a hardware structure specified for artificial intelligence (AI) model processing. An artificial intelligence model may be generated by machine learning. Such learning may be performed, e.g., by the electronic device 300 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. In an embodiment, the artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module

176) of the electronic device 300. The various data may include, for example, software (e.g., the program 140) and input data or output data for a command related thereto. In another embodiment, the memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 300, from the outside (e.g., a user) of the electronic device 300. In an embodiment, the input module 150 may include, for example, a microphone, a mouse, a keyboard, a key (e.g., a button), or a digital pen (e.g., a stylus pen).

The sound output module 155 may output sound signals to the outside of the electronic device 300. The sound output module 155 may include, for example, a speaker or a receiver. The speaker may be used for general purposes, such as playing multimedia or playing record. In an embodiment, the receiver may be used for receiving incoming calls. According to another embodiment, the receiver may be implemented as separate from, or as part of the speaker.

The display module 160 may be configured to visually provide information to the outside (e.g., a user) of the electronic device 300. The display module 160 may include, for example, a display, a hologram device, or a projector and control circuitry to control a corresponding one of the display, hologram device, and projector. In another embodiment, the display module 160 may include a touch sensor adapted to detect a touch, or a pressure sensor adapted to measure the intensity of force incurred by the touch.

The audio module 170 may convert a sound into an electrical signal and vice versa. According to one embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 300.

The sensor module 176 may detect an operational state (e.g., power or temperature) of the electronic device 300 or an environmental state (e.g., a state of a user) external to the electronic device 300, and then generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 300 to be coupled with the external electronic device (e.g., the electronic device 102) directly (e.g., wiredly) or wirelessly. In an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 300 may be physically connected with the external electronic device (e.g., the electronic device 102). In another embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement)

or electrical stimulus which may be recognized by a user via his tactile sensation or kinesthetic sensation. According to one embodiment, the haptic module 179 may include, for example, a motor, a piezoelectric element, or an electric stimulator.

The camera module 180 may capture a still image or moving images. According to another embodiment, the camera module 180 may include one or more lenses, image sensors, image signal processors, or flashes.

The power management module 188 may manage power supplied to the electronic device 300. According to one embodiment, the power management module 188 may be implemented as at least part of, for example, a power management integrated circuit (PMIC).

The battery 189 may be configured to supply power to at least one component of the electronic device 300. In an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 300 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. In an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 300 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mm Wave) band) to achieve, e.g., a high data transmission rate. In an embodiment, the wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 300, an external electronic device (e.g., the electronic device 104), or a network system (e.g., the second network 199). According to another embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may be configured to transmit or receive a signal or power to or from the outside (e.g., the external electronic device) of the electronic device 300. In an embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

According to some embodiments, the antenna module 197 may form a mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 300 and the external electronic device 104 via the server 108 coupled with the second network 199. Each of the electronic devices 102 or 104 may be a device of a same type as, or a different type, from the electronic device 300. According to another embodiment, all or some of operations to be executed at the electronic device 300 may be executed at one or more of the external electronic devices 102, 104, or 108. If the electronic device 300 should perform a function or a service automatically, or in response to a request from a user or another device, the electronic device 300, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 300. In an embodiment, the electronic device 300 may provide the outcome, with or without further processing of the outcome, as at least part of a reply to the request. To that end, a cloud computing, distributed computing, mobile edge computing (MEC), or client-server computing technology may be used, for example. The electronic device 300 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 300 may be applied to intelligent services (e.g., smart home, smart city, smart car, or health-care) based on 5G communication technology or IoT-related technology.

Figure 3B:
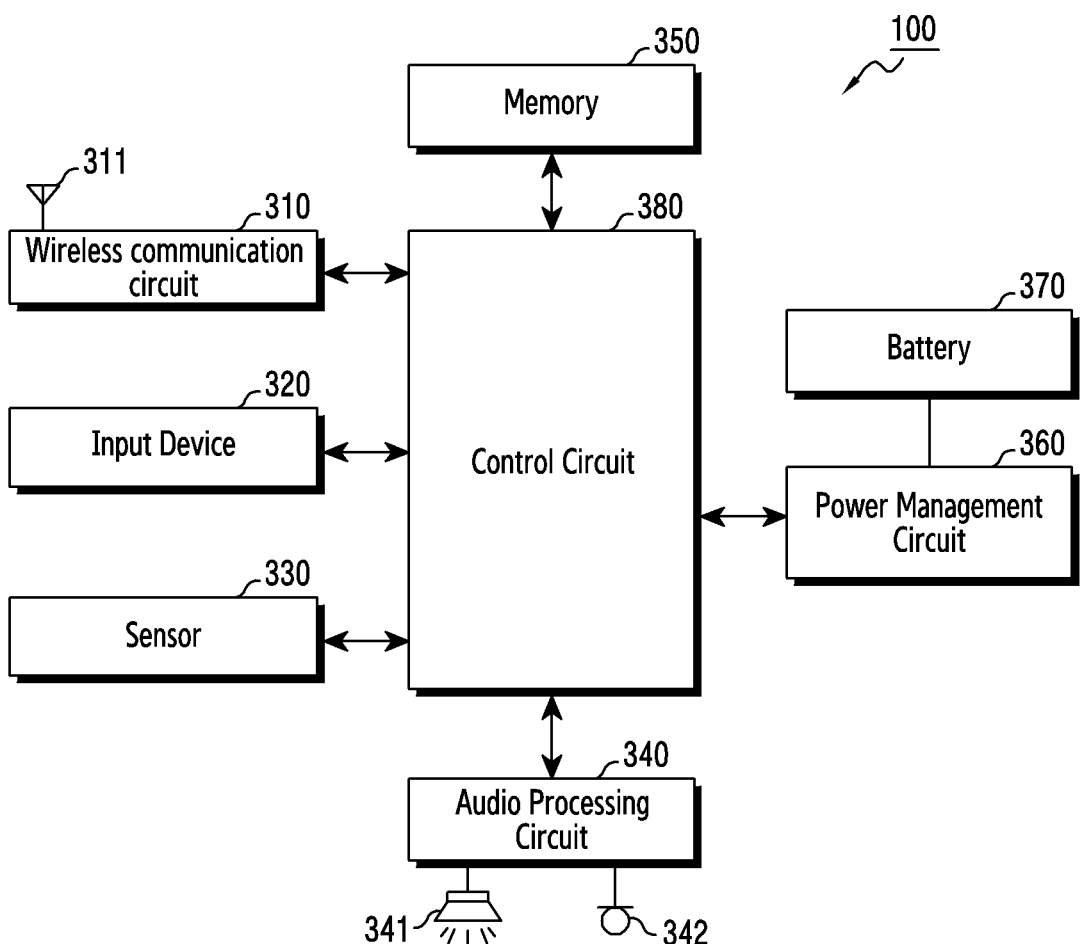
FIG. 3B is a block diagram illustrating an audio output device according to an embodiment of the disclosure.

FIG. 3B is a block diagram illustrating the audio output device 100 according to an embodiment of the disclosure.

Referring to FIG. 3B, an audio output device 100 (e.g., a first audio output device 100a and/or a second audio output device 100b) may include a plurality of electronic components disposed in the inner space thereof. According to an embodiment, the audio output device 100 may include a communication circuit 310 (e.g., a communication module 190 in FIG. 3A), an antenna 311 (e.g., an antenna module 197 in FIG. 3A), an input device 320 (e.g., a input module 150 in FIG. 3A), a sensor 330 (e.g., a sensor module 176 in FIG. 3A), an audio processing circuit 340 (e.g., an audio module 170 in FIG. 3A), a speaker 341 (e.g., a sound output module 155 of FIG. 3A), a microphone 342 (e.g., a input module 150 in FIG. 3A), a memory 350 (e.g., a memory 130 in FIG. 3A), a power management circuit 360 (e.g., a power management module 188 in FIG. 3A), a battery 370 (e.g., a battery 189 in FIG. 3A), and a control circuit 380 (e.g., a processor 120 in FIG. 3A). However, the embodiment is not limited thereto, and one or more of the electronic components may be omitted or other electronic components may be further included. The components corresponding to those in FIGS. 3A and 3B may perform the same function.

In an embodiment, the audio output device 100 may refer to at least one of the first audio output device 100a and the second audio output device 100b, or may refer to a device (e.g., a master device among the first audio output device 100a and the second audio output device 100b, in regard to a communication connection with the electronic device 300 through communication) connected to the electronic device 300 through communication among the first audio output device 100a and the second audio output device 100b.

In another embodiment, the antenna (or antenna radiator) 311 may support various types of communication. In yet another embodiment, the antenna 311 may support short-range communication. The short-range communication may include, for example, at least one of wireless fidelity (Wi-Fi), Bluetooth, Bluetooth low energy (BLE), near field communication (NFC), global navigation satellite system (GNSS), and ultra-wide-band (UWB).

The antenna 311 may support cellular communication. The cellular communication may include, for example, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communications (GSM).

According to an embodiment, the antenna 311 may also include a radiator (e.g., a wireless charging coil) to support wireless charging. The antenna 311 may be used to wirelessly transmit power to an external device or to receive power wirelessly from an external device.

According to another embodiment, the wireless communication circuit 310 may support various types of communication by using the antenna 311. According to an embodiment, the wireless communication circuit 310 may support reception of audio data from an external device (e.g., a server, a smartphone, a PC, a personal digital assistant (PDA), or an access point). According to an embodiment, the wireless communication circuit 310 may also support transmission of audio data to an external device (e.g., another audio output device).

According to yet another embodiment, the input device 320 may be configured to generate various input signals necessary for operating the audio output device 100. In an embodiment, the input device 320 may include a touch pad, a touch panel, and/or a button. For example, the touch pad may recognize a touch input through at least one of a capacitive scheme, a pressure-sensitive scheme, an infrared scheme, and an ultrasonic scheme. The button may include a physical button, and/or an optical button.

According to still another embodiment, the input device 320 may generate a user input related to turning on or off the power of the audio output device 100. The input device 320 may generate a user input related to communication (e.g., short-range communication) connection between the audio output device 100 and an external device.

In an embodiment, the input device 320 may generate a user input related to audio data (or audio content). The user input may be related to functions such as starting playback of audio data, pausing playback, stopping playback, adjusting playback speed, adjusting playback volume, or muting audio data.

In another embodiment, the sensor 330 may measure physical data related to the audio output device 100 or detect an operating state of the audio output device 100. In addition, the sensor 330 may convert measured or sensed information into an electrical signal. In yet another embodiment, the sensor 330 may include at least one of a proximity sensor, an acceleration sensor, a gyro sensor, a geomagnetic sensor, a magnetic sensor, a gesture sensor, a grip sensor, or a bio sensor. In still another embodiment, the sensor 330 may detect information or a signal relating to whether the audio output device 100 is worn on the user's body.

According to an embodiment, the audio processing circuit 340 may support an audio data collection function and reproduce collected audio data. According to another embodiment, the audio processing circuit 340 may include an audio decoder and a digital-to-analog (D/A) converter. The audio decoder may convert audio data stored in the memory 350 into a digital audio signal, and the D/A converter may convert the digital audio signal converted by the audio decoder into an analog audio signal. According to yet another embodiment, the audio decoder may convert audio data received from an external device (e.g., a server, a smartphone, a PC, a PDA, or an access point) through the wireless communication circuit 310 and stored in the memory 350 into a digital audio signal. The speaker 341 may output an analog audio signal converted by the D/A converter. The audio processing circuit 340 may include an analog-to-digital (A/D) converter. The A/D converter may convert an analog voice signal transmitted through the microphone 342 into a digital voice signal.

In an embodiment, the audio processing circuit 340 may reproduce various audio data configured in the operation of the audio output device 100. For example, the audio processing circuit 340 may be designed to reproduce audio data related to a corresponding effect or guide sound when the audio output device 100 is detected as being worn on the ear or being detached from the ear. In another embodiment, the audio processing circuit 340 may be designed to reproduce audio data related to a corresponding effect or guide sound when the audio output device 100 is detected as being coupled to or being separated from another electronic device (e.g., the power supply device 200). The output of effect sound or guide sound may be omitted according to the configuration by a user or the intension by a designer. In yet another embodiment, the audio processing circuit 340 may be designed to be included in the control circuit 380.

The memory 350 may store data or application programs and algorithms corresponding to various operating systems and various user functions necessary for the operation of the audio output device 100. In an embodiment, the memory 350 may include, for example, a high-speed random-access memory and/or a non-volatile memory, such as one or more magnetic disk storage devices, one or more optical storage devices, and/or a flash memory (e.g., NAND, NOR).

According to an embodiment, the memory 350 may include a non-volatile memory that stores non-volatile audio data received from an external device (e.g., a server, a smartphone, a PC, a PDA, or an access point). According to another embodiment, the memory 350 may include a volatile memory that stores volatile audio data received from an external device.

In an embodiment, the power management circuit 360 (e.g., a power management integrated circuit (PMIC)) may efficiently manage and optimize power use of the battery 370 within the audio output device 100. The control circuit 380 may perform adjustment according to a load to be processed and transmit a signal adjusted accordingly to the power management circuit 360. The power management circuit 360 may adjust the power to be supplied to the control circuit 380.

The power management circuit 360 may include a battery charging circuit. According to one embodiment, when the audio output device 100 is coupled to an external device, the power management circuit 360 may charge the battery 370 by receiving power from the external device.

According to another embodiment, the power management circuit 360 may include a wireless charging circuit. The wireless charging circuit may wirelessly receive power from an external device through the antenna 311 and charge the battery 370 by using the received power.

According to yet another embodiment, the control circuit 380 may be configured to collect various data and calculate a desired output value. The control circuit 380 may support various operations, based on at least a portion of a user input from the input device 320.

The control circuit 380 may be configured to receive audio data from an external device (e.g., a server, a smartphone, a PC, a PDA, or an access point) through the wireless communication circuit 310 and store the received audio data in the memory 350. In an embodiment, the control circuit 380 may receive non-volatile audio data (or download audio data) from an external device and store the received non-volatile audio data in a non-volatile memory. In another embodiment, the control circuit 380 may receive volatile audio data (or streaming audio data) from an external device and store the received volatile audio data in a volatile memory.

According to one embodiment, the control circuit 380 may reproduce and audio data (e.g., non-volatile audio data or volatile audio data) stored in the memory 350 and output the same through the speaker 341. The control circuit 380 may obtain an audio signal (reproduce audio data) by decoding audio data and output the obtained audio signal through the speaker 341.

According to another embodiment, the control circuit 380 may perform various operations, based on at least a portion of information obtained from the sensor 330. The control circuit 380 may determine whether the audio output device 100 is worn on the user's body, from information obtained from the sensor 330.

According to yet another embodiment, in a mode in which the audio output device 100 receives audio data from an external device and outputs the same to the speaker 341, when the audio output device 100 is identified as being in a state (e.g., a state in which the audio output device 100 is accommodated in the power supply device 200) in which the audio output device 100 is not worn on the user's body, the control circuit 380 may stop the mode or transmit a signal related thereto to the external device. According to still another embodiment, the external device may receive a signal regarding a state in which the audio output device 100 is not worn on the user's body, and stop transmitting audio data to the audio output device 100. The external device may stop transmitting audio data to the audio output device 100, based on the deactivation of the wireless communication circuit 310 by the audio output device 100. For example, when the audio output device 100 is accommodated in the power supply device 200, the audio output device 100 may deactivate the wireless communication circuit 310, and the external device may stop transmitting audio data to the audio output device 100, based on the deactivation.

The audio output device 100 may further include various components according to the provided form thereof. In addition, according to the provided form of the audio output device 100, certain components among the above-described components may be excluded from the audio output device 100 or may be replaced with other components.

FIG. 4 is a flowchart illustrating a method for transmitting information on a charging state of the audio output device 100 according to an embodiment of the disclosure.

In the following embodiments, each operation may be performed sequentially, but not necessarily sequentially. The order of each operation may be changed, and at least two operations may be performed in parallel. In an example, operations 410 and 420 may be performed simultaneously, or operation 410 may be performed after operation 420 is performed.

The operations in FIG. 4 may be performed by the audio output device 100 in FIGS. 3A and 3B. Referring to FIG. 4, the control circuit 380 of the audio output device 100 according to an embodiment may perform releasing a communication connection with the electronic device 300, using the wireless communication circuit 310 when an electrical connection between the audio output device 100 and the power supply device 200 is detected in operation 410, starting charging the battery 370 of the audio output device 100 by using the power supplied from the power supply device 200 in operation 420, determining whether either the residual capacity of the battery 370 of the audio output device 100 or the residual capacity of the battery of the power supply device 200 satisfies a designated charging condition during charging of the battery 370 of the audio output device 100 in operation 430, activating the wireless communication circuit 310 when the designated charging condition is satisfied in operation 440, transmitting information on the charging state of the audio output device 100 or the power supply device 200 to the electronic device 300 in operation 450, determining whether a response signal is received from the electronic device 300 within a predetermined time after transmitting the information on the charging state in operation 460, and deactivating the activated wireless communication circuit 310 when the response signal is received within the predetermined time. Hereinafter, each operation of FIG. 4 will be described in detail.

In an embodiment, in operation 410, when an electrical connection between the audio output device 100 and the power supply device 200 is detected, the control circuit 380 may release a communication connection with the electronic device 300, using the wireless communication circuit 310. In operation 420, the control circuit 380 may start charging the battery 370 of the audio output device 100 by using power supplied from the power supply device 200. When the audio output device 100 is mounted (or accommodated) on the power supply device 200, an electrical connection between the audio output device 100 and the power supply device 200 may be detected. According to another embodiment, the electrical connection between the audio output device 100 and the power supply device 200 may be detected by the audio output device 100, or may be detected by the power supply device 200 so that the detection may be transferred to the audio output device 100 through communication (e.g., PLC communication) with the audio output device 100. Hereinafter, a method for detecting an electrical connection between the audio output device 100 and/or the power supply device 200 by the audio output device 100 and/or the power supply device 200 will be described in detail.

In yet another embodiment, a terminal of the audio output device 100 (e.g., the first interface 103 and/or the second interface 105) and a terminal of the power supply device 200 (e.g., the first interface 206 and/or the second interface 208) is in contact to electrically connected to each other, the control circuit 380 may recognize that the audio output device 100 is mounted on the power supply device 200. The control circuit 380 may release the communication between the audio output device 100 and the electronic device 300 and start charging the battery 370 of the audio output device 100. For example, the control circuit 380 may deactivate at least a portion of the wireless communication circuit 310 or may cause the wireless communication circuit 310 to be operated in a low power mode. The wireless communication circuit 310 may not perform Tx/Rx operation or reduce the time and/or frequency of performing the Tx/Rx operation while maintaining the communication connection between the audio output device 100 and the electronic device 300. According to one embodiment, when the terminal of the audio output device 100 and the terminal of the power supply device 200 are electrically connected to each other, the control circuit 380 may perform power line communication (PLC) between the audio output device 100 and the power supply device 200.

In another embodiment, when the electrical connection between the terminal of the audio output device 100 and the terminal of the power supply device 200 is recognized, the control circuit 380 may start charging the battery 370 of the audio output device 100, and when the lid of the power supply device 200 is recognized as having been closed after the recognition of the electrical connection, the control circuit 380 may release a communication connection with the electronic device 300. The control circuit 380 may first perform operation 420 and then perform operation 410.

According to yet another embodiment, the closed state of the lid of the power supply device 200 may be detected by the audio output device 100 by using the Hall sensor of the audio output device 100, and may also be detected by the audio output device 100 by using various parts (e.g., a hinge module and a closing button module) included in the audio output device 100. According to another embodiment, the closed state of the lid of the power supply device 200 may be detected by the power supply device 200 and be transferred to the audio output device 100 through communication (e.g., power line communication (PLC)) with the audio output device 100. For example, a Hall sensor may be disposed on at least a part of the lid of the power supply device 200, a magnet may be disposed on a part of the audio output device 100, and the power supply device 200 may detect that the audio output device 100 is located inside the power supply device 200, through the Hall sensor and the interface, and transmit state information to the audio output device 100.

According to one embodiment, in a state in which the audio output device 100 is accommodated in the power supply device 200, the control circuit 380 of the audio output device 100 may deactivate at least partial function of the audio output device 100. The control circuit 380 may limit the use of one or more algorithms, such as an algorithm for outputting audio of the audio output device 100, and may use only an algorithm for charging the battery 370 of the audio output device 100. For another example, when a communication connection between the audio output device 100 and the electronic device 300 is released, the communication connection between the two audio output devices 100a and 100b may also be released.

According to another embodiment, in operation 430, during charging of the battery 370 of the audio output device 100, the control circuit 380 may determine whether the residual capacity of the battery 370 of the audio output device 100 or the residual capacity of the battery of the power supply device 200 satisfies a designated charging condition. According to yet another embodiment, when the audio output device 100 is charged in the power supply device 200, power may be supplied from the battery of the power supply device 200 to the battery 370 of the audio output device 100. During this process, the residual capacity of the battery of the power supply device 200 may decrease, and the residual capacity of the battery 370 of the audio output device 100 may increase. In an embodiment, a series of processes in which the residual capacity of the battery 370 increases may be referred to as a process in which the battery 370 is charged. The ratio of the residual capacity of the usable battery 370 relative to the total capacity of the battery 370 may be referred to as a charge rate, and a state in which the total capacity of the battery 370 and the residual capacity of the battery 370 are substantially equal may be referred to as a fully charged state. Hereinafter, the designated charging condition for the residual capacity of the battery 370 of the audio output device 100 and the designated charging condition for the residual capacity of the battery of the power supply device 200 will be described in detail.

In an embodiment, in operation 430, the control circuit 380 may determine whether the designated charging condition is satisfied, based on the residual capacity information of the battery 370 of the audio output device 100. For example, when the charge rate of the battery 370 of the audio output device 100 reaches a specific charge rate (e.g., 60% or 90%) or whenever the charge rate of the battery 370 of the audio output device 100 increases by a specific value (e.g., every 10% increase), the control circuit 380 may determine that the designated charging condition is satisfied.

In another embodiment, the control circuit 380 may determine whether the designated charging condition is satisfied, based on the usable time of the audio output device 100. The control circuit 380 may determine that the designated charging condition is satisfied, when the residual capacity of the battery 370 reaches a charge rate corresponding to a designated usable time. For example, a user may configure a desired usable time of the audio output device 100 to 4 hours. When the charge rate of the battery 370 of the audio output device 100 reaches the charge rate of the battery 370 that may be used for 4 hours, the control circuit 380 may determine that a designated charging condition is satisfied, based on a state of charge (SOC) algorithm.

In yet another embodiment, when the residual capacity of the battery 370 of the audio output device 100 does not change for a predetermined time, that is, when an error occurs in charging the battery 370 of the audio output device 100, the control circuit 380 may determine that the designated charging condition is satisfied.

In still another embodiment, in operation 430, the control circuit 380 may determine whether the designated charging condition is satisfied, based on the residual capacity information of the battery of the power supply device 200. When the charge rate of the battery of the power supply device 200 reaches a specific charge rate (e.g., 10% or 20%) or whenever the charge rate of the battery of the power supply device 200 increases by a specific value (e.g., every 10% increase), the control circuit 380 may determine that the designated charging condition is satisfied. In an embodiment, when the battery residual capacity of the power supply device 200 is less than or equal to a predetermined certain level, guide information for inducing a user to charge the power supply device 200 may be provided by the electronic device 300 and/or the power supply device 200. For example, the electronic device 300 may output a related message through a display, and the power supply device 200 may directly output vibration or an alarm.

When the battery residual capacity of the power supply device 200 does not change for a predetermined time or longer, that is, when an error occurs in charging the battery 370 of the audio output device 100, the control circuit 380 may determine that the designated charging condition is satisfied. For another example, when the battery residual capacity of the power supply device 200 does not change for a predetermined time or longer, that is, when an error occurs during charging of the battery of the power supply device 200 (e.g., wireless charging position is bad), the control circuit 380 may determine that the designated charging condition is satisfied.

According to an embodiment, when the battery residual capacity of the power supply device 200 increases, that is, when the power supply device 200 is connected to a charger, the control circuit 380 may determine that the designated charging condition is satisfied. When the battery residual capacity of the power supply device 200 reaches a specific charge rate (e.g., 50%, 100%) or whenever the battery residual capacity of the power supply device 200 increases by a specific value (e.g., every 10% increase) the control circuit 380 may determine that the designated charging condition is satisfied.

According to another embodiment, to obtain the battery residual capacity information of the power supply device 200, the control circuit 380 may receive the battery residual capacity information of the power supply device 200 by using communication (e.g., PLC communication) connection with the power supply device 200. According to still another embodiment, a communication connection between the audio output device 100 and the power supply device 200 in a state where the audio output device 100 is mounted on the power supply device 200 may be a wired communication connection. A wired communication connection between the audio output device 100 and the power supply device 200 may be different from a wireless communication connection between the audio output device 100 and the electronic device 300. The communication connection between the audio output device 100 and the power supply device 200 may be performed through a wireless communication connection (e.g., NFC) different from the wireless communication connection (e.g., Bluetooth or BLE) between the audio output device 100 and the electronic device 300. For example, when the audio output device 100 and the power supply device 200 include an NFC communication chip, the audio output device 100 may obtain information relating to whether the audio output device 100 is accommodated in the power supply device 200 and the battery residual capacity information of the power supply device 200 through the NFC communication chip.

In an embodiment, the control circuit 380 may receive battery residual capacity information of the power supply device 200 in real time or at specific intervals by using a communication connection with the power supply device 200. In another embodiment, the control circuit 380 may receive battery residual capacity information of the power supply device 200 in response to detection of a specific movement (e.g., shaking) of the power supply device 200 or detection of an input by a button mounted on the power supply device 200. In yet another embodiment, the designated charging condition may be a condition preconfigured in the audio output device 100 or a condition configured by a user through the electronic device 300. For example, a designated charging condition for activating the wireless communication circuit 310 may be preconfigured from the time when the audio output device 100 is designed. In an embodiment, the audio output device 100 may activate the wireless communication circuit 310, based on the charging condition of the audio output device 100 and/or the charging condition of the power supply device 200. For another example, a user may configure conditions for activating the wireless communication circuit 310 of the audio output device 100 through the electronic device 300. The user may perform configuration through the electronic device 300 such that the wireless communication circuit 310 of the audio output device 100 is activated based on the charging condition of the audio output device 100 and/or the charging condition of the power supply device 200.

In an embodiment, during charging of the battery 370 of the audio output device 100, when both the residual capacity of the battery 370 of the audio output device 100 and the residual capacity of the battery of the power supply device 200 do not satisfy the designated charging condition (No in 430), the control circuit 380 may periodically identify the state of the battery 370 or communicate with the power supply device 200 to identify the battery residual capacity of the power supply device 200.

In another embodiment, operation 430 may be determined by an artificial intelligence (AI) module. Various state information of the audio output device 100 and/or the power supply device 200 may be input values, and the artificial intelligence module may determine operation 430, based on the input values and determine whether to activate the wireless communication circuit according to the determination result.

In yet another embodiment, when the control circuit 380 determines that either the residual capacity of the battery 370 of the audio output device 100 or the residual capacity of the battery of the power supply device 200 satisfies a designated charging condition during charging of the battery 370 of the audio output device 100 (Yes in 430), the control circuit 380 may activate the wireless communication circuit 310 in operation 440. The control circuit 380 may reestablish a communication connection with the electronic device 300 having been released, by temporarily activating the wireless communication circuit 310. According to one embodiment, communication between the audio output device 100 and the electronic device 300 may be performed by using Bluetooth communication (e.g., Bluetooth or BLE).

According to another embodiment, the control circuit 380 may transmit information on a charging state of the audio output device 100 or the power supply device 200 to the electronic device 300 in operation 450. For example, the control circuit 380 may receive information on the charging state of the power supply device 200 through power line communication (PLC), and may transmit at least one of the received information and/or a charging state of the audio output device 100 to the electronic device 300. According to yet another embodiment, the control circuit 380 may transmit information on the charging state to the electronic device 300 such that information on the charging state of the audio output device 100 or the power supply device 200 is displayed by the electronic device 300. The electronic device 300 may provide information on the received charge state through a display, a speaker, an indicator, or vibration. The electronic device 300 may provide information on the charging state of the audio output device 100 or the power supply device 200 by providing a notification through a user interface via a display, a notification through a sound output through a speaker, a visual notification through an indicator, or a notification through vibration. A method for providing a notification by the electronic device 300 may be determined according to a charging state of the audio output device 100 or the power supply device 200, a state of the electronic device 300 being used (e.g., the activation or deactivation of the electronic device 300, the type of application being used by the electronic device 300), and/or a user's configuration.

A method for activating the wireless communication circuit 310 to transmit information on the charging state of the audio output device 100 or the power supply device 200 to the electronic device 300 will be described in detail later.

In an embodiment, information on the charging state of the audio output device 100 transmitted to the electronic device 300 may include at least one of information on the charge rate of the battery 370 of the audio output device 100, information on the usable time of the battery 370 of the audio output device 100, information on an elapsed time after the charging of the battery 370 of the audio output device 100 starts, information on an estimated time required until the battery 370 of the audio output device 100 is fully charged, information on a heat state of the audio output device 100, and/or information on a charging error that occurred during charging of the battery 370 of the audio output device 100.

In another embodiment, information on the charging state of the power supply device 200 transmitted to the electronic device 300 may include at least one of information on a charge rate of the battery of the power supply device 200, information on the number of times for charging the battery 370 of the audio output device 100 by the battery of the power supply device 200, information on a heat state of the power supply device 200, information on whether the battery of the power supply device 200 is charged, information on a charging means (e.g. wired charging, wireless charging) of the battery of the power supply device 200, and/or information on charging errors occurring during battery charging of the power supply device 200. In an embodiment, the information transmitted to the electronic device 300 in the above-described operation 450 is an example and is not limited thereto. For example, the control circuit 380 may transmit various information on the audio output device 100 or the power supply device 200 to the electronic device 300.

According to yet another embodiment, in operation 460, the control circuit 380 may determine whether a response signal is received from the electronic device 300 within a predetermined time after transmitting the information on the charging state. When the control circuit 380 effectively transmits information on the charging state of the audio output device 100 or the power supply device 200 to the electronic device 300, the electronic device 300 may transmit a response packet as a response signal to the audio output device 100. Accordingly, the control circuit 380 may determine whether the information on the charging state is successfully transmitted, based on whether a response signal is received from the electronic device 300 within a predetermined time after transmitting the information on the charging state. According to one embodiment, when a process of receiving a response signal from the electronic device 300 is not required, operation 460 may be omitted.

According to one embodiment, when the control circuit 380 receives a response signal from the electronic device 300 within a predetermined time after transmitting the information on the charging state (Yes in 460), the control circuit 380 may deactivate the wireless communication circuit 310 of the audio output device 100, activated in operation 470. In another embodiment, the state in which the wireless communication circuit 310 is continuously activated may cause disadvantage in terms of current consumption of the battery 370 of the audio output device 100. Accordingly, the control circuit 380 activates the wireless communication circuit 310 only while transmitting information on the charging state of the audio output device 100 or the power supply device 200 to the electronic device 300, thereby reducing power consumed by the battery 370 of the audio output device 100.

In another embodiment, when the control circuit 380 fails to receive a response signal from the electronic device 300 within a predetermined time after transmitting the information on the charging state (No in 460), the control circuit 380 may transmit information on the charging state of the audio output device 100 and/or the power supply device 200 to the electronic device 300 again. Accordingly, even when the electronic device 300 is not present around the audio output device 100 or a communication problem occurs between the audio output device 100 and the electronic device 300, the control circuit 380 may repeatedly attempt information transmission on the charging state and increase the success rate of information transmission.

Figure 5:
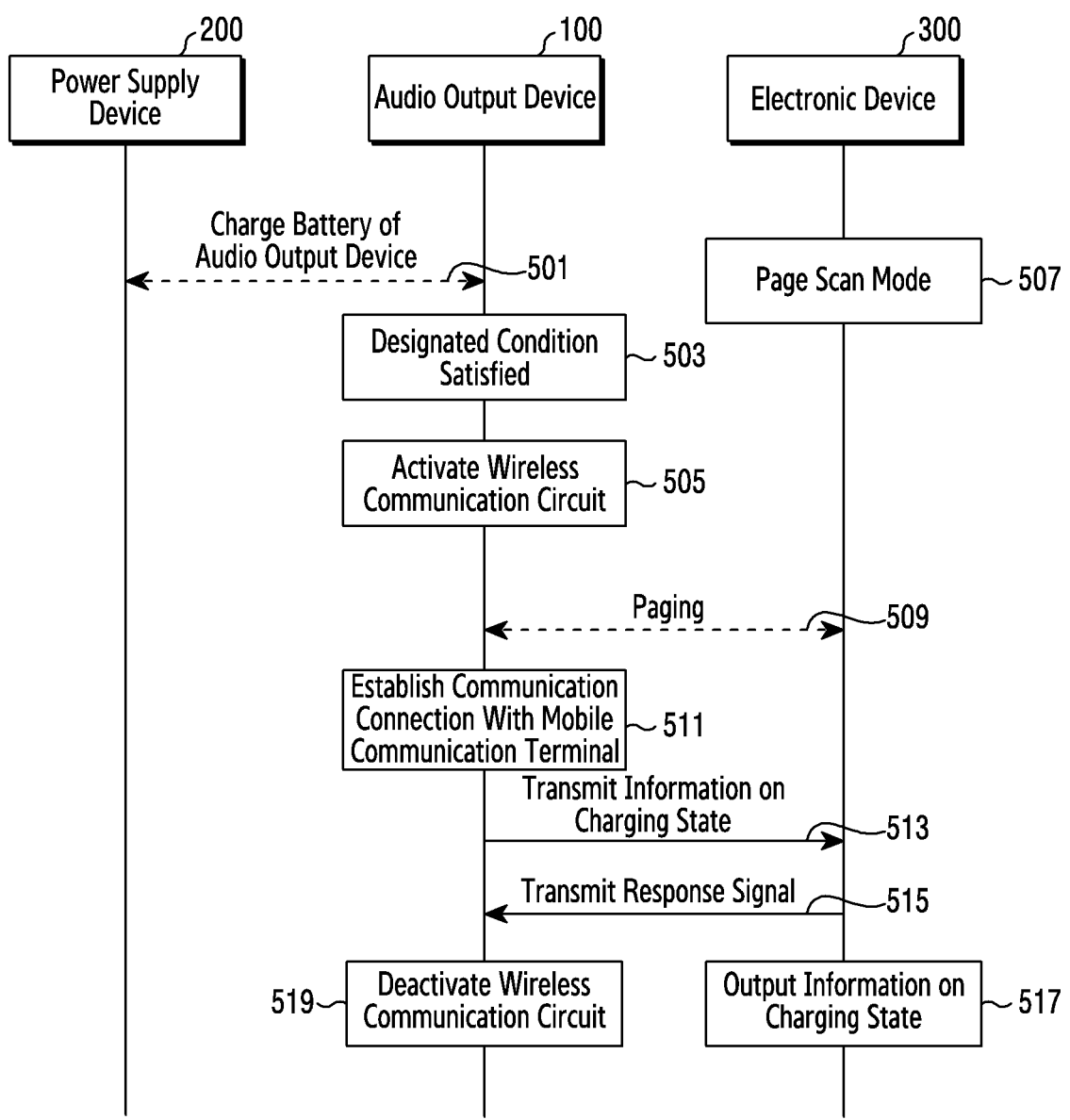
FIG. 5 is a flowchart illustrating a method in which an audio output device establishes a communication connection with an electronic device to transmit information on a charging state according to an embodiment of the disclosure.

FIG. 5 is a flowchart illustrating a method in which the audio output device 100 establishes a communication connection with the electronic device 300 to transmit information on a charging state according to an embodiment of the disclosure.

Figure 6:
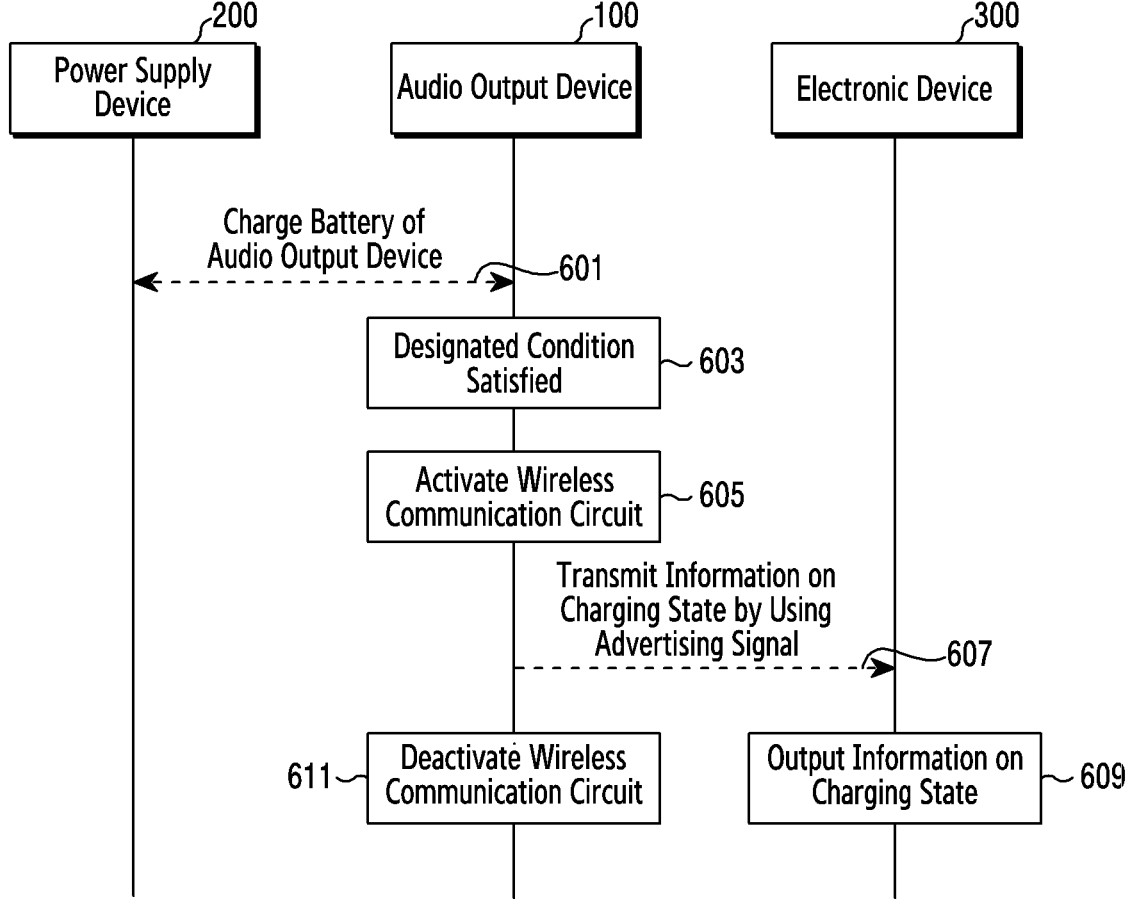
FIG. 6 is a flowchart illustrating a method in which an audio output device transmits information on a charging state by using an advertising signal according to an embodiment of the disclosure.

FIG. 6 is a flowchart illustrating a method in which the audio output device 100 transmits information on the charging state by using an advertising signal according to an embodiment of the disclosure.

In an embodiment, to activate a wireless communication circuit 310 to transmit information on a charging state of an audio output device 100 or a power supply device 200 in operations 440 and 450, a control circuit 380 may directly communicate with the power supply device 200 or may transmit information without a direct communication connection. The detailed description will be given with reference to FIGS. 5 and 6 below.

Referring to FIG. 5, in operation 501, the battery 370 of the audio output device 100 may be in a charging state by using power supplied from the power supply device 200. For example, the audio output device 100 may be electrically connected to the power supply device 200 to receive power to charge the battery 370, and at least a portion of the wireless communication circuit 310 of the audio output device 100 may be deactivated and thus be in a state in which a communication connection with the electronic device 300 is released. According to one embodiment, in operation 503, the audio output device 100 (or the control circuit 380 of the audio output device 100) may determine that a designated condition (e.g., a designated charging condition related to the residual capacity of the battery 370 of the audio output device 100 or the residual capacity of the battery of the power supply device 200) is satisfied while the battery 370 of the audio output device 100 is being charged. The audio output device 100 may periodically identify the charging state of the battery 370 (e.g., the residual capacity of the battery 370) and/or the charging state of the power supply device 200 (e.g., the battery residual capacity or the charging state of the power supply device 200). When the designated condition is satisfied, the control circuit 380 may activate the wireless communication circuit 310 in operation 505. According to an embodiment, when the electronic device 300 operates in operation 507 (i.e., a page scan mode), the audio output device 100 may transmit an ID packet to the electronic device 300 by using the last connected address of the electronic device 300. When the audio output device 100 transmits the identification (ID) packet, in operation 509, the audio output device 100 may perform a paging process with the electronic device 300 in a page scan state.

According to another embodiment, communication (e.g., Bluetooth communication) between the audio output device 100 and the electronic device 300 may be connected in operation 511 after the paging process. According to yet another embodiment, in operation 513, the control circuit 380 may transmit information on the charging state of the audio output device 100 or the power supply device 200 to the electronic device 300 through communication connected using the wireless communication circuit 310. The electronic device 300 which has received the information, may transmit a response packet, which is a response signal, to the audio output device 100 in operation 515. According to still another embodiment, the response packet may include an address and identification information of the electronic device 300. In operation 517, the electronic device 300 may provide the received information on the charging state of the audio output device 100 or the power supply device 200 to a user. For example, the electronic device 300 may provide information on the charging state of the audio output device 100 or the power supply device 200 to the user by using at least one of the display module 160, the sound output module 155, and the haptic module 179. When a response signal is received through the wireless communication circuit 310, the control circuit 380 may deactivate the wireless communication circuit 310 in operation 519 and release the communication connection. In another embodiment, when the control circuit 380 fails to receive a response signal within a first designated time after transmitting information on the charging state through the wireless communication circuit 310, the control circuit 380 may deactivate the wireless communication circuit 310 after retransmitting the information on the charging state for a second designated time.

Operation 601 in FIG. 6 may correspond to operation 501 in FIG. 5, operation 603 in FIG. 6 may correspond to operation 503 in FIG. 5, operation 605 in FIG. 6 may correspond to operation 505 in FIG. 5, operation 609 in FIG. 6 may correspond to operation 517 in FIG. 5, and operation 611 in FIG. 6 may correspond to operation 519 in FIG. 5. Descriptions identical, similar, or corresponding to those described above will be omitted. Operation 607 in FIG. 6 will be described in detail below.

Referring to FIG. 6, after activating the wireless communication circuit 310 in operation 605, the control circuit 380 of the audio output device 100 may transmit information about the charging state of the audio output device 100 or the power supply device 200 to an external electronic device (e.g., the electronic device 300) by using an advertising signal through the wireless communication circuit 310 in operation 607. In an embodiment, the control circuit 380 may transmit an advertising signal to all electronic devices present around the audio output device 100 to transmit the information rather than transmitting the information on the charging state to a specific electronic device through which communication is connected. For example, in the case of BLE communication, one-way data transmission may be possible using an advertising signal. In another embodiment, the control circuit 380 may periodically transmit an advertising packet, which is, an advertising signal, through the wireless communication circuit 310 at predetermined intervals. In yet another embodiment, the audio output device 100 may transmit an advertising signal strength equal to or less than a designated signal strength such that an external electronic device (e.g., the electronic device 300) located around the audio output device 100 receives information on the charging state. Only an external electronic device (e.g., the electronic device 300) located within a designated distance from the audio output device 100 may receive information on the charging state and provide the received information to a user.

When an external network (or external server) is available, the audio output device 100 may transmit an advertising signal to an account server, based on the account information of the audio output device 100, and may transmit information on the charging state of the audio output device 100 or the power supply device 200 only to a device having the same account information among external electronic devices (e.g., the electronic device 300) in the vicinity thereof.

Figure 7:
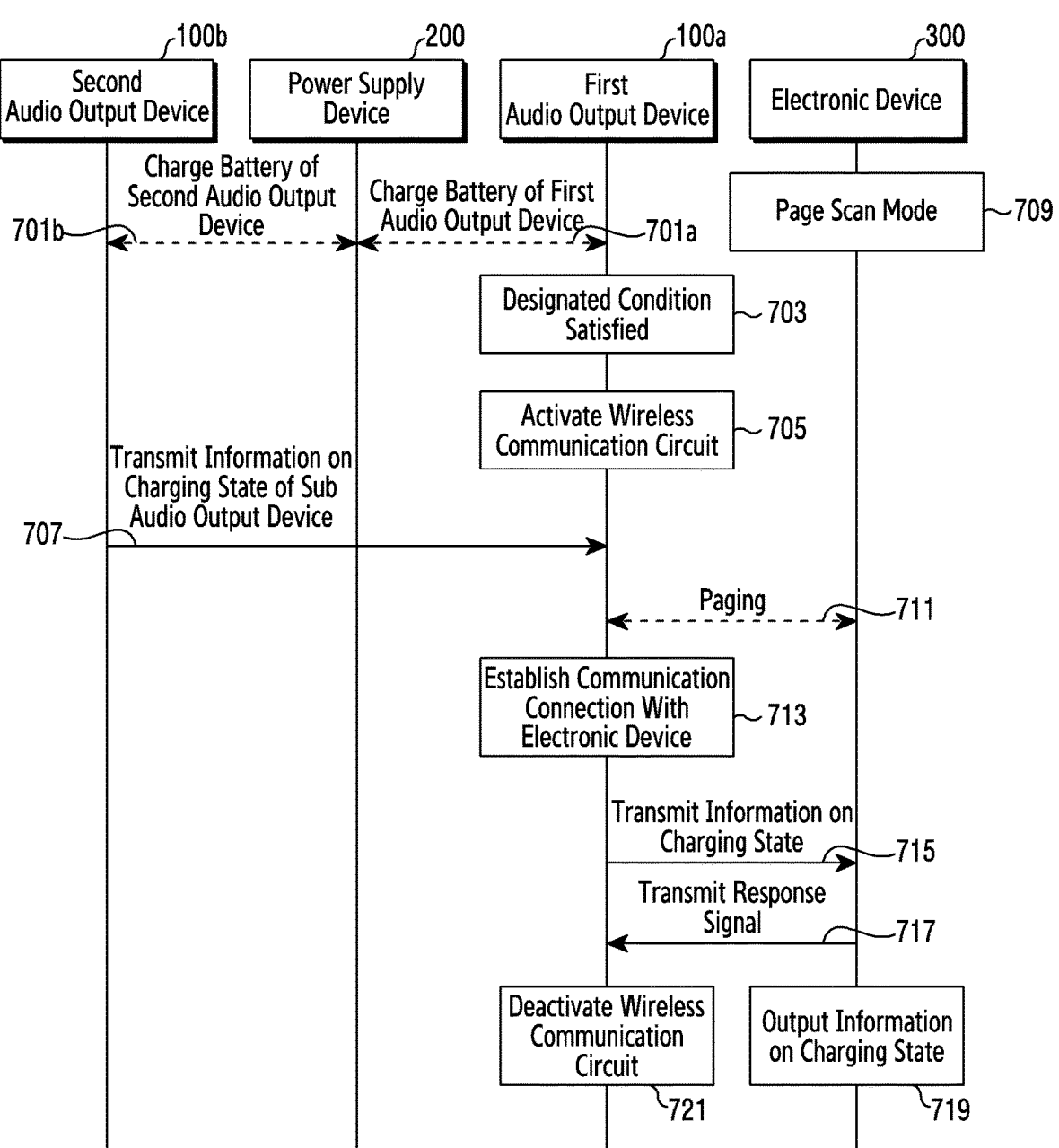
FIG. 7 is a flowchart illustrating a method for transmitting collected information obtained by collecting information on a charging state of a second audio output device from a first audio output device according to an embodiment of the disclosure.

FIG. 7 is a flowchart illustrating a method for transmitting collected information obtained by collecting information on a charging state of the second audio output device 100*b* from the first audio output device 100*a* according to an embodiment of the disclosure.

Referring to FIG. 7, two audio output devices (e.g., a first audio output device 100*a* and a second audio output device 100*b*) may form a pair, and in this case, one may serve as the first audio output device 100*a* and the other may serve as the second audio output device 100*b*. In an embodiment, the first audio output device 100a according to an embodiment may collect information on the charging state of the second audio output device 100b, a power supply device 200, and/or the first audio output device 100a to transmit the collected information to an electronic device 300. According to another embodiment, the first audio output device 100a may generate a communication path with the electronic device 300. For example, the electronic device 300 may be connected to the first audio output device 100a among the pair of audio output devices 100a and 100b. When the electronic device 300 is connected to the first audio output device 100a, the electronic device 300 or the first audio output device 100a may provide information on the communication path to the second audio output device 100b such that the second audio output device 100b outputs the audio. According to yet another embodiment, the first audio output device 100a and the second audio output device 100b may generate a communication path. The first audio output device 100a and the second audio output device 100b may transmit information on a communication path with the electronic device or transmit/receive information on a battery state through the communication path generated between the two devices.

Operation 703 in FIG. 7 may correspond to operation 503 in FIG. 5, operation 705 in FIG. 7 may correspond to operation 505 in FIG. 5, operation 709 in FIG. 7 may correspond to operation 507 in FIG. 5, operation 711 in FIG. 7 may correspond to operation 509 in FIG. 5, operation 713 in FIG. 7 may correspond to operation 511 in FIG. 5, operation 715 in FIG. 7 may correspond to operation 513 in FIG. 5, operation 717 in FIG. 7 may correspond to operation 515 in FIG. 5, operation 719 in FIG. 7 may correspond to operation 517 in FIG. 5, and operation 721 in FIG. 7 may correspond to operation 519 in FIG. 5. Descriptions identical, similar, or corresponding to those described above will be omitted. Hereinafter, operation 701a, operation 701b, and operation 707 in FIG. 7 will be described in detail.

According to one embodiment, among two or more audio output devices (e.g., the first audio output device 100a or the second audio output device 100b) constituting the audio output device 100, the first audio output device 100a may refer to a device configured as a master device severing to generate a communication link with the electronic device 300 and serving as transmit data generated by the audio output device 100 to the electronic device 300. According to another embodiment, the master device may be determined before the audio output device (the first audio output device 100a or the second audio output device 100b) performs charging from the power supply device 200 or at the time when a wireless communication circuit (e.g., the wireless communication circuit 310) is activated (e.g., operation 705).

Referring to FIG. 7, in operation 701a, the battery of the first audio output device 100a may be in a charging state using power supplied from the power supply device 200, and in operation 701b, the battery of the second audio output device 100b may be in a charging state using power supplied from the power supply device 200. The batteries of the first audio output device 100a and/or the second audio output device 100b may be in a charging state using the power received from the power supply device 200, and at least a portion of the wireless communication circuit 310 of the first audio output device 100a and/or the second audio output device 100b may be deactivated and thus in a state where a communication connection with the electronic device 300 is released.

In an embodiment, the first audio output device 100a may receive information on the charging state of the second audio output device 100b in operation 707. In operation 715, the first audio output device 100a may transmit information on the charging state of the audio output device (e.g., the first audio output device 100a and/or the second audio output device 100b) and/or information on the charging state of the power supply device 200 to the electronic device 300. In another embodiment, the order of performing operation 707 is not limited to that shown in FIG. 7 and may be changed. For example, operation 707 may be performed any time after the designated condition is satisfied in operation 703 and before information on the charging state is transmitted in operation 715. In yet another embodiment, the criterion for determining the designated condition by the first audio output device 100a in operation 703 may be based on the designated condition (e.g., residual capacity of the battery (e.g., battery 370) of the first audio output device 100a or residual capacity of the battery (e.g., battery 370) of the second audio output device 100b) of each of the first audio output device 100a or the second audio output device 100b or based on the sum or average of the residual quantities of the batteries of the first audio output device 100a and the second audio output device 100b.

According to one embodiment, the first audio output device 100a (or the control circuit 380 of the first audio output device 100a) may receive information on the charging state of the second audio output device 100b through power line communication (PLC) connected with the power supply device 200. In an example, before performing operation 703 or while performing operation 703, the power supply device 200 may receive information on the charging state of the second audio output device 100b and transmit the information to the first audio output device 100a by performing power line communication (PLC) with the second audio output device 100b. In another embodiment, the first audio output device 100a may receive information on the charging state of the second audio output device 100b through communication directly connected with the second audio output device 100b. When the first audio output device 100a and/or the second audio output device 100b determines that the designated condition is satisfied in operation 703, the first audio output device 100a and/or the second audio output device 100b may activate the wireless communication circuit (e.g., the wireless communication circuit 310) to transmit and receive the information on the charging state. For another example, when the first audio output device 100a determines that the designated condition is satisfied in operation 703, the first audio output device 100a may request information on the charging state of the second audio output device 100b from the power supply device 200, or request the power supply 200 to activate the wireless communication circuit (e.g., the wireless communication circuit 310) of the second audio output device 100b. The first audio output device 100a may receive the information on the charging state of the second audio output device 100b through a communication connection between the two devices, based on the activation of the wireless communication circuit (e.g., the wireless communication circuit 310) of the second audio output device 100b.

The first audio output device 100a may use a relay scheme among Bluetooth communication schemes. As shown in FIG. 7, the first audio output device 100a may receive information through communication directly connected with the second audio output device 100b, and may transmit the received information through communication connected with the electronic device 300. For another example, the first audio output device 100a may use a true wireless stereo (TWS+) scheme among Bluetooth communication schemes. As shown in FIG. 5, the first audio output device 100a and the second audio output device 100b may communicate with the electronic device 300 to transmit information. Information on the charging state of the power supply device 200 may be collected from the first audio output device 100a and/or the second audio output device 100b and transmitted to the electronic device 300.

Figure 8A:
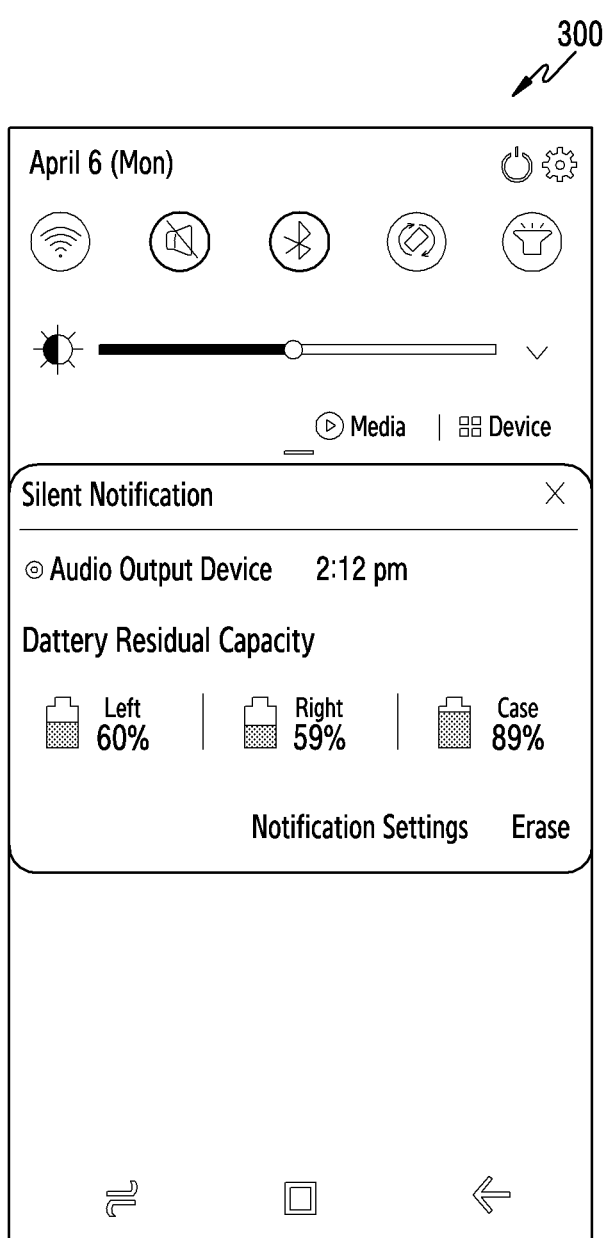
FIG. 8A is a view illustrating a method for displaying information on a charging state by an electronic device according to an embodiment of the disclosure.
Figure 8B:
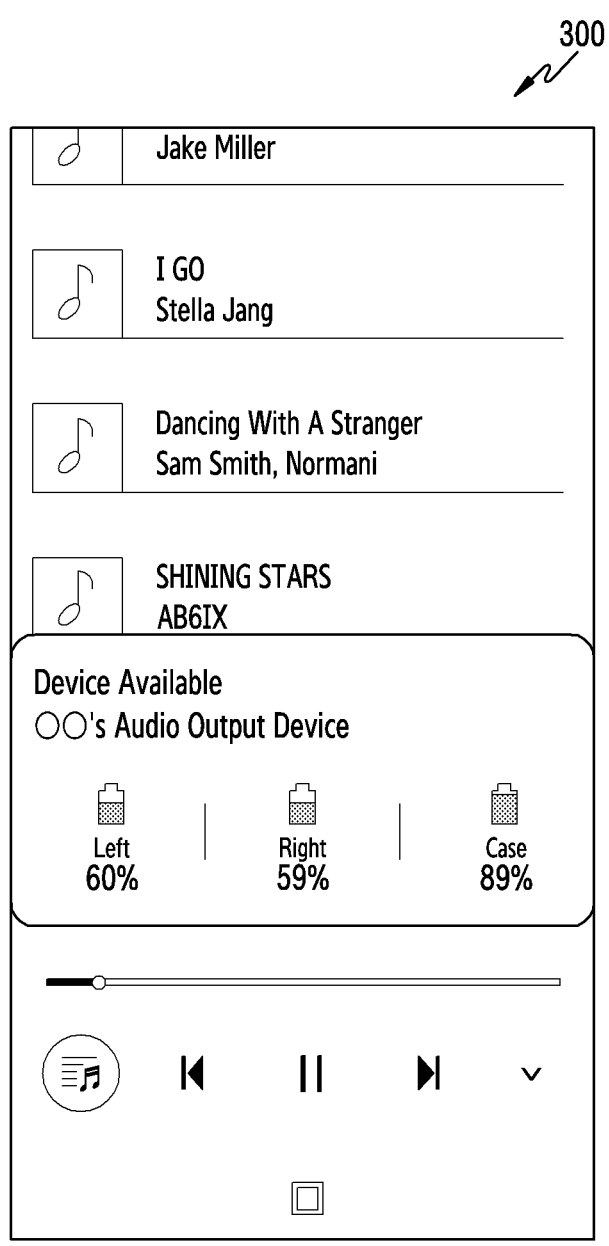
FIG. 8B is a view illustrating a method for displaying information on a charging state by an electronic device according to an embodiment of the disclosure.

FIGS. 8A and 8B are views illustrating a method for displaying information on a charging state by the electronic device 300 according to various embodiments of the disclosure.

In an embodiment, an electronic device 300 may output information on the charging state of an audio output device 100 or a power supply device 200 received from the audio output device 100 through a display of the electronic device 300. Accordingly, when a charge rate of a battery 370 of the audio output device 100 reaches a desired charge rate, a user may receive a notification through the electronic device 300, and may identify the last information received from the electronic device 300 at any time.

Referring to FIGS. 8A and 8B, the electronic device 300 may output information on the charging state of the audio output device 100 or the power supply device 200 received from the audio output device 100 as a pop-up message, or may output the information through a navigation bar or through an application (e.g., a manager of the audio output device 100). However, the method for outputting the information on the charging state of the audio output device 100 or the power supply device 200 by the electronic device 300 is not limited thereto, and may be output using various methods.

According to one embodiment, as a condition for transmitting, by the control circuit 380, information on the charging state to the electronic device 300, the control circuit 380 may employ a designated time condition or a designated sensor condition as well as a designated charging condition for the battery residual capacity of the audio output device 100 or the power supply device 200, or may use a combination of the above conditions. The descriptions of the conditions will be given in detail using FIGS. 9 and 10 below.

Figure 9:
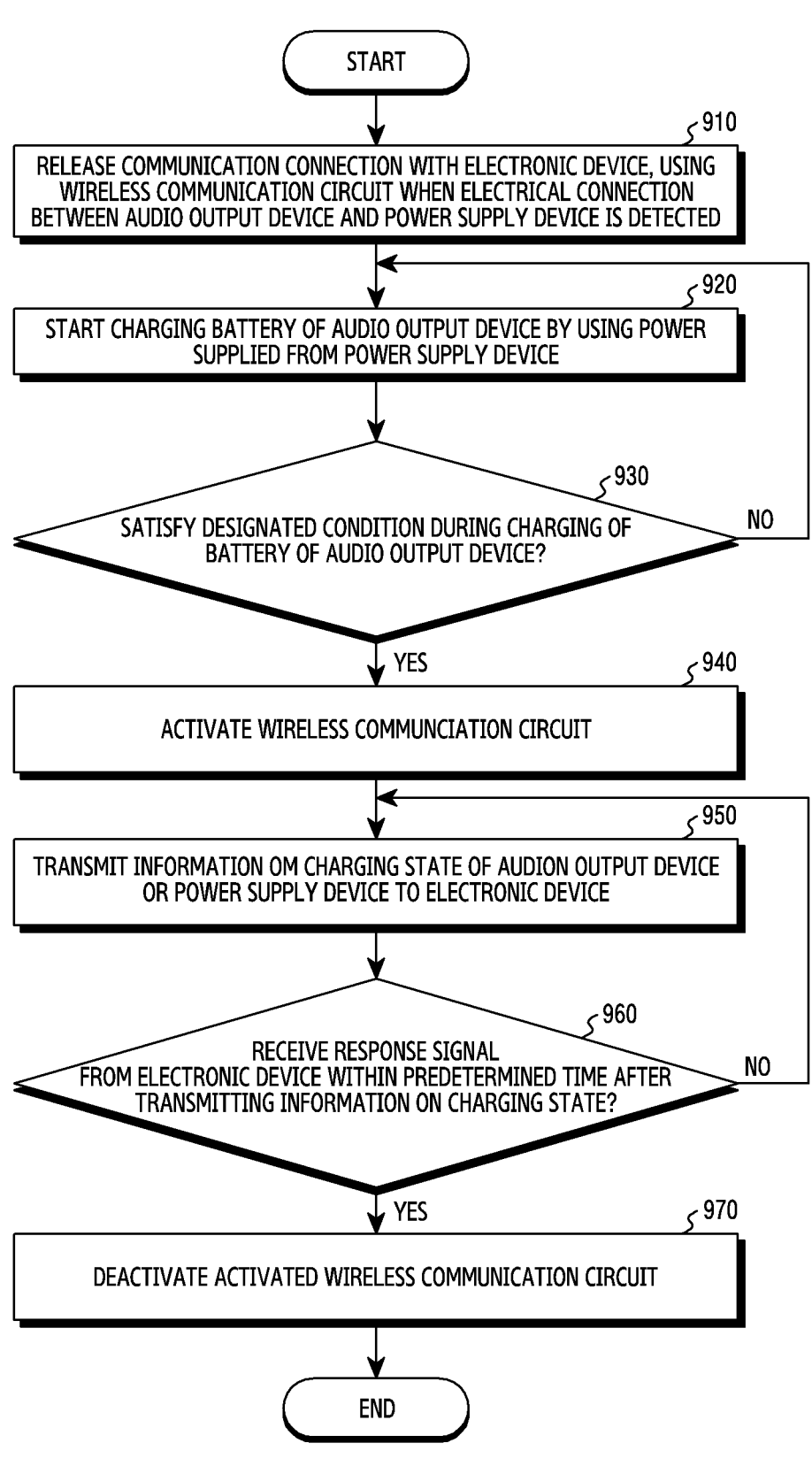
FIG. 9 is a flowchart illustrating a method for transmitting information on a charging state of an audio output device according to an embodiment of the disclosure.

FIG. 9 is a flowchart illustrating a method for transmitting information on the charging state of the audio output device 100 according to an embodiment of the disclosure.

Operation 910 in FIG. 9 may correspond to operation 410 in FIG. 4, operation 920 in FIG. 9 may correspond to operation 420 in FIG. 4, operation 940 in FIG. 9 may correspond to operation 440 in FIG. 4, operation 950 in FIG. 9 may correspond to operation 450 in FIG. 4, operation 960 in FIG. 9 may correspond to operation 460 in FIG. 4, and operation 970 in FIG. 9 may correspond to operation 470 in FIG. 4. Descriptions identical, similar, or corresponding to those described above will be omitted. Operation 930 in FIG. 9 will be described in detail below.

Referring to FIG. 9, in operation 930, the control circuit 380 may determine whether a designated time condition is satisfied during charging of the battery 370 of the audio output device 100, and may activate the wireless communication circuit 310 in operation 940 when the designated time condition is satisfied (Yes in 930).

In an embodiment, in operation 930, the control circuit 380 may determine whether a designated charging condition is satisfied, based on an elapsed time after the charging of the battery 370 of the audio output device 100 starts. For example, when a specific time (e.g., 30 minutes) has elapsed after the charging of the battery 370 of the audio output device 100 starts, the control circuit 380 may determine that a designated time condition is satisfied, and when it is determined that the designated condition is satisfied, the control circuit 380 may activate the wireless communication circuit 310. In another example, the control circuit 380 may determine that a designated time condition is satisfied every specific time (e.g., every 30 minutes) after the charging of the battery 370 of the audio output device 100 starts, and when it is determined that the designated condition is satisfied, the control circuit 380 may activate the wireless communication circuit 310.

According to another embodiment, in operation 930, the control circuit 380 may determine whether a designated charging condition is satisfied, based on time information at which the battery 370 of the audio output device 100 is being charged. When charging of the battery 370 of the audio output device 100 is performed in the late-night time zone (e.g., 11:00 pm to 7:00 am), the control circuit 380 may determine that the designated time condition is not satisfied. According to yet another embodiment, the audio output device 100 may receive a request to stop transmission of information on the charging state through the electronic device 300. In an example, the request to stop transmission of information on the charging state may include information on a designated time (e.g., late-night time zone). For another example, the request to stop transmission of information on the charging state may include information indicating to stop transmission of information on the charging state until the electronic device 300 receives a request to resume transmission of information on the charging state.

Figure 10:
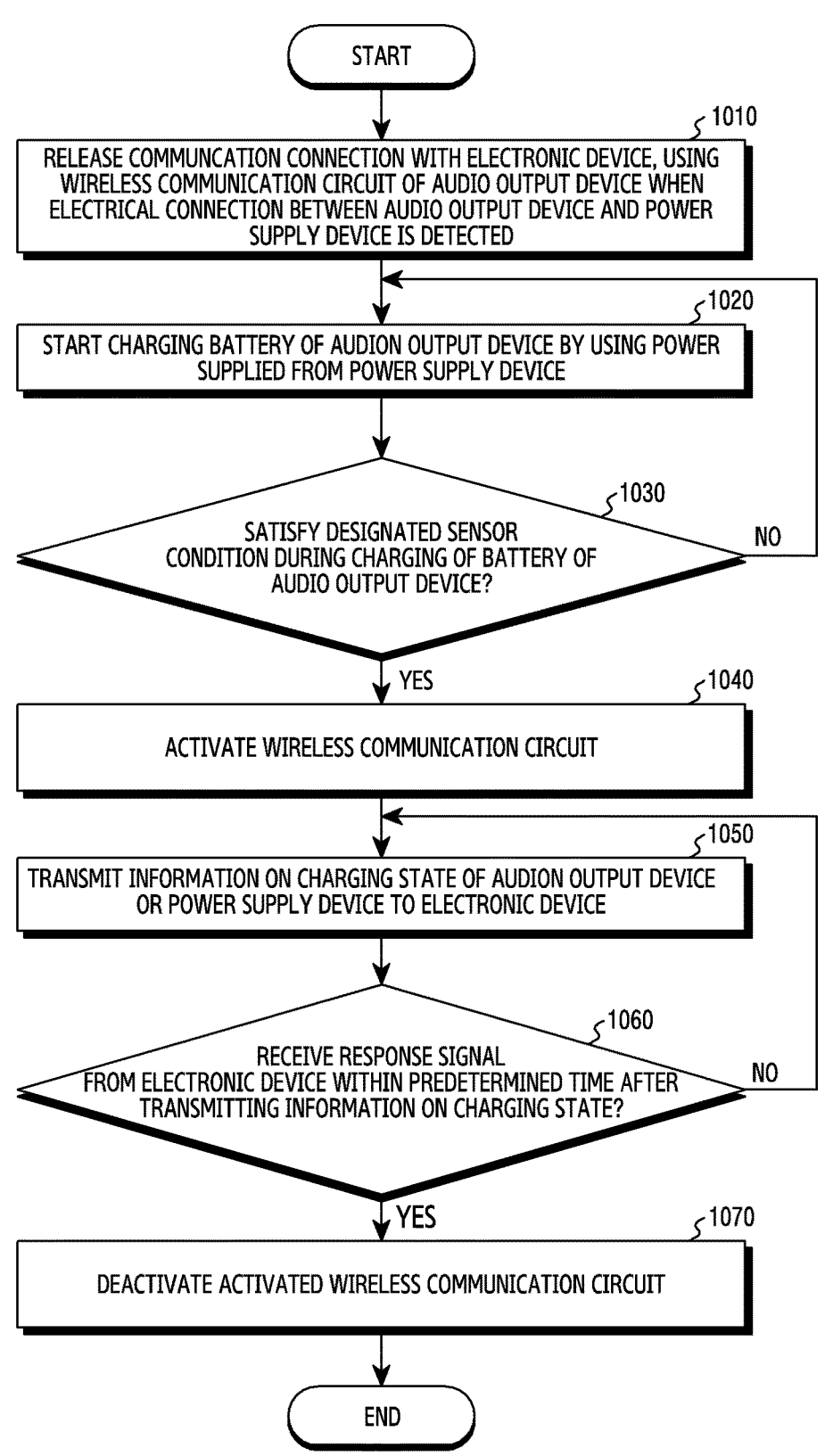
FIG. 10 is a flowchart illustrating a method for transmitting information on a charging state of an audio output device according to an embodiment of the disclosure.

FIG. 10 is a flowchart illustrating a method for transmitting information on a charging state of the audio output device 100 according to an embodiment of the disclosure.

Operation 1010 in FIG. 10 may correspond to operation 410 in FIG. 4, operation 1020 in FIG. 9 may correspond to operation 420 in FIG. 4, operation 1040 in FIG. 9 may correspond to operation 440 in FIG. 4, operation 1050 in FIG. 9 may correspond to operation 450 in FIG. 4, operation 1060 in FIG. 9 may correspond to operation 460 in FIG. 4, and operation 1070 in FIG. 9 may correspond to operation 470 in FIG. 4. Descriptions identical, similar, or corresponding to those described above will be omitted. Operation 1030 in FIG. 9 will be described in detail below.

Referring to FIG. 10, in operation 1030, the control circuit 380 may determine whether a designated sensor condition (or sensing condition) is satisfied during charging of the battery 370 of the audio output device 100, and in case that the designated sensing condition is satisfied (Yes in 1030), the control circuit 380 may activate the wireless communication circuit 310 in operation 1040.

In an embodiment, in operation 1030, the control circuit 380 may determine whether a designated sensing condition is satisfied, based on whether a specific movement is detected based on the sensing information detected by the sensor 330 mounted on the audio output device 100. The control circuit 380 may determine the movement, based on sensing information obtained from the sensor 330 of the audio output device 100. Accordingly, when sensing data corresponding to a designated movement is obtained by the sensor 330, the control circuit 380 may determine that the designated sensing condition is satisfied, and activate the wireless communication circuit 310.

In another embodiment, like the designated charging condition in FIG. 4, the designated time condition in FIG. 9 and the designated sensing condition in FIG. 10 may a condition preconfigured in the audio output device 100 and may be a condition configured by a user through the electronic device 300. For example, a designated time condition or a designated sensing condition for activating the wireless communication circuit 310 may be preconfigured from the time when the audio output device 100 is designed. In another example, the user may configure the audio output device 100 through the electronic device 300 to activate the wireless communication circuit 310, based on a designated time condition or a designated sensing condition.

In yet another embodiment, as a condition for activating the wireless communication circuit 310 to transmit information on the charging state of the audio output device 100 or the power supply device 200 to the electronic device 300, the control circuit 380 may determine by combining two or more conditions among a designated charging condition, a designated time condition, and/or a designated sensing condition. In an example, during charging of the battery 370 of the audio output device 100, when either the residual capacity of the battery 370 of the audio output device 100 or the residual capacity of the battery of the power supply device 200 satisfies a designated charging condition, and also satisfies the designated time condition, the control circuit 380 may activate the wireless communication circuit 310. For another example, when the residual capacity of the battery 370 of the audio output device 100 reaches 90% during charging of the battery 370 of the audio output device 100 and 30 minutes have elapsed after the charging of the battery 370 starts, the control circuit 380 may activate the wireless communications circuitry 310. In yet another example, during charging of the battery 370 of the audio output device 100, when either the residual capacity of the battery 370 of the audio output device 100 or the residual capacity of the battery of the power supply device 200 satisfies a designated charging condition, and also satisfies a designated sensing condition, the control circuit 380 may activate the wireless communication circuit 310. The residual capacity of the battery 370 of the audio output device 100 reaches 90% during charging of the battery 370 of the audio output device 100 and sensing data corresponding to a specific movement is acquired by the sensor 330 of the audio output device 100, the control circuit 380 may activate the wireless communication circuit 310.

Figure 11:
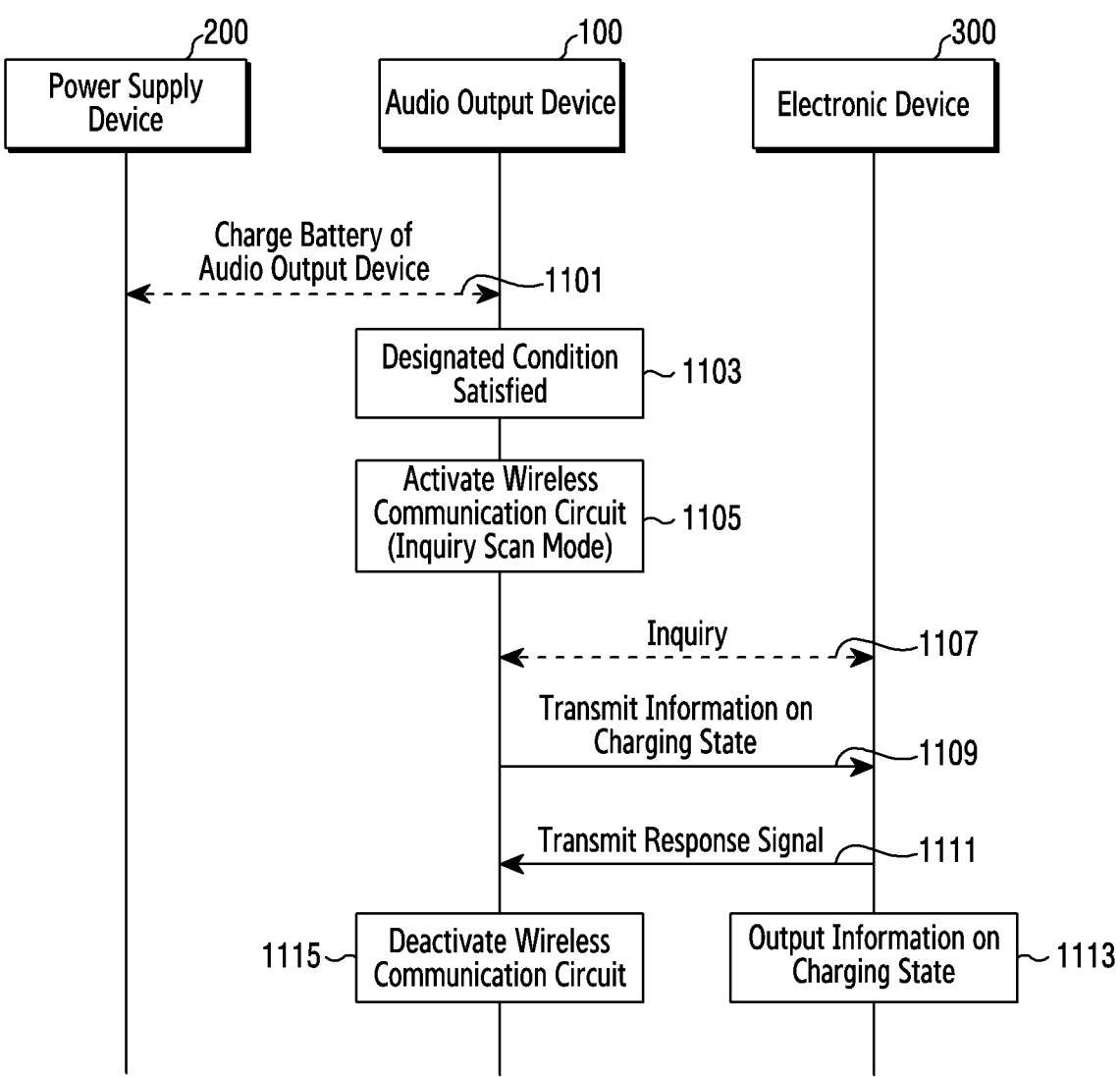
FIG. 11 is a flowchart illustrating a method in which an audio output device transmits information on a charging state without establishing a communication connection with an electronic device according to an embodiment of the disclosure.

FIG. 11 is a flowchart illustrating a method in which the audio output device 100 transmits information on a charging state without establishing a communication connection with the electronic device 300 according to an embodiment of the disclosure.

According to one embodiment, when a history of a communication connection between an audio output device 100 and an electronic device 300 is present, the audio output device 100 may transmit information on the charging state through an inquiry without a communication connection therebetween. For example, an inquiry may be a process in which the electronic device 300 searches for an external electronic device (e.g., an audio output device 100) existing therearound.

Referring to FIG. 11, operation 1101 may correspond to operation 501 in FIG. 5, operation 1103 may correspond to operation 503 in FIG. 5, operation 1111 in FIG. 11 may correspond to operation 515 in FIG. 5, operation 1113 in FIG. 11 may correspond to operation 517 in FIG. 5, and operation 1115 in FIG. 11 may correspond to operation 519 in FIG. Descriptions identical, similar, or corresponding to those described above will be omitted. Operation 1105, operation 1107, and operation 1109 in FIG. 11 will be described in detail below.

Referring to FIG. 11, the audio output device 100 (or the control circuit 380 of the audio output device 100) may determine whether a designated condition is satisfied during charging of the battery 370 of the audio output device 100. The designated condition in operation 1103 may correspond to the designated condition in operation 503 of FIG. 5. When audio output device 100 determines that the designated condition is satisfied, the audio output device 100 may activate the wireless communication circuit 310 in operation 1105, and in this case, the audio output device 100 perform the operation in an inquiry scan mode. In an embodiment, when the electronic device 300 transmits an ID packet through broadcasting while the audio output device 100 operates in the in an inquiry scan mode, the audio output device 100 may receive the ID packet in operation 1107, and an inquiry process with the electronic device 300 may be performed. In another embodiment, the audio output device 100 may transmit information on the charging state through an FHS packet and/or an EIR packet in operation 1109 in response to reception of the ID packet. The electronic device 300 may identify information on the charging state through the received FHS packet and/or EIR packet by using the address of the audio output device 100 that has been connected in the past.

Figure 12:
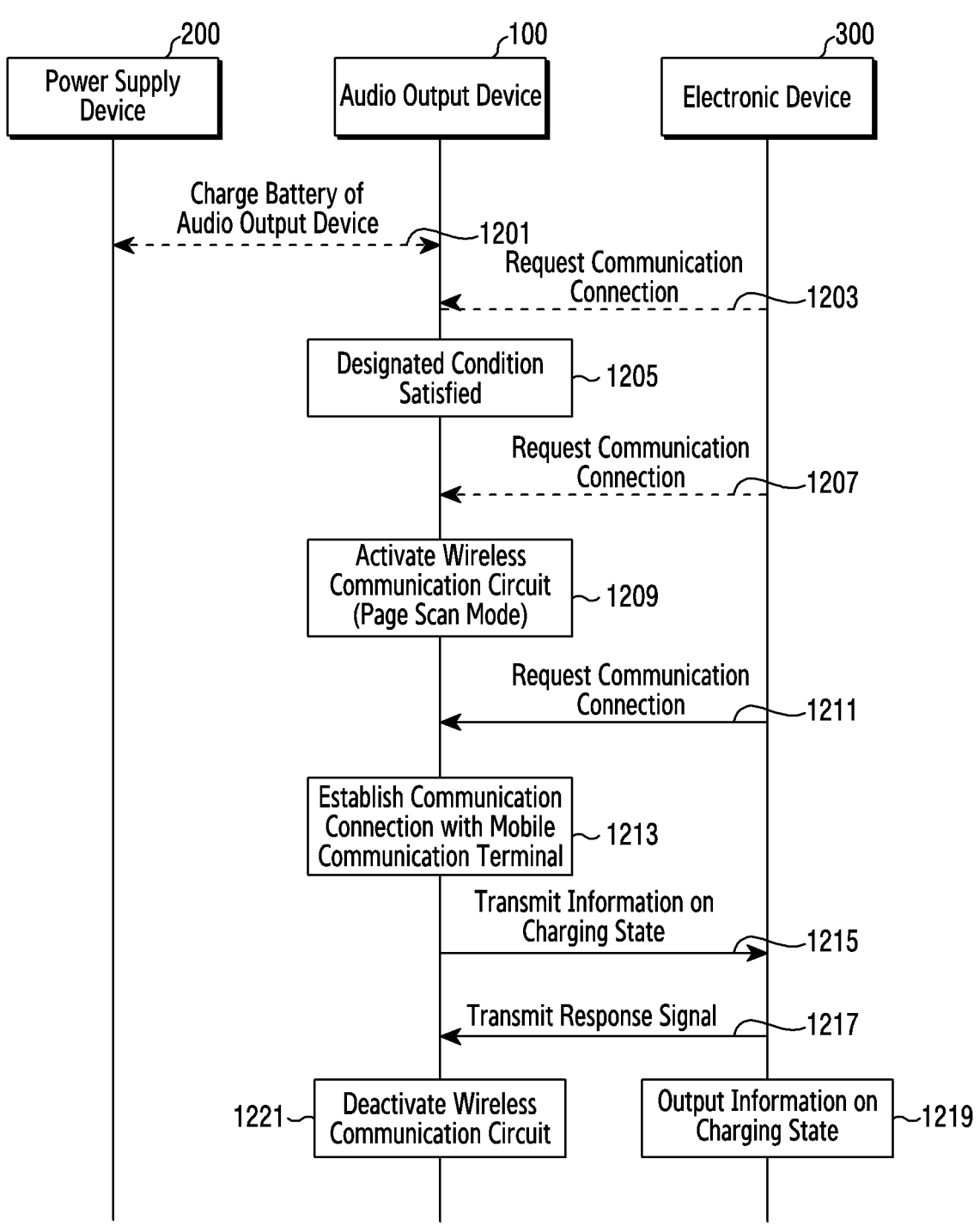
FIG. 12 is a flowchart illustrating a method for transmitting information on a charging state from an audio output device in response to a communication connection request from an electronic device according to an embodiment of the disclosure.

FIG. 12 is a flowchart illustrating a method for transmitting information on a charging state from the audio output device 100 in response to a communication connection request from an electronic device 300 according to an embodiment of the disclosure.

Referring to FIG. 12, according to an embodiment, when a communication connection request (or a request for providing information on a charging state of an audio output device 100 or a power supply device 200) is received from an electronic device 300, a control circuit 380 of the audio output device 100 may activate a wireless communication circuit 310 to establish a wireless communication connection with the electronic device 300 and transmit information on the charging state of the audio output device 100 or the power supply device 200.

Operation 1201 in FIG. 12 may correspond to operation 501 in FIG. 5, operation 1205 in FIG. 12 may correspond to operation 503 in FIG. 5, operation 1213 in FIG. 12 may correspond to operation 511 in FIG. 5, operation 1215 in FIG. 12 may correspond to operation 513 in FIG. 5, operation 1217 in FIG. 12 may correspond to operation 515 in FIG. 5, and operation 1219 in FIG. 12 may correspond to operation 517 in FIG. 5, operation 1221 in FIG. 12 may correspond to operation 519 in FIG. 5. Descriptions identical, similar, or corresponding to those described above will be omitted. Operations 1209 and 1211 in FIG. 12 will be described in detail below.

Referring to FIG. 12, the audio output device 100 (or the control circuit 380 of the audio output device 100) may determine whether a designated condition is satisfied during charging of the battery 370 of the audio output device 100. In an example, the designated condition in operation 1205 may correspond to the designated condition in operation 503 in FIG. 5. When the audio output device 100 determines that the designated condition is satisfied, the audio output device 100 may activate the wireless communication circuit 310 in operation 1209. The audio output device 100 may perform operation in a page scan mode. In an embodiment, when the audio output device 100 is in the page scan mode, the audio output device 100 may receive a paging request from an external electronic device (e.g., the electronic device 300). When charging of the battery 370 of the audio output device 100 starts through the power supply device 200, the wireless communication circuit 310 of the audio output device 100 may be deactivated, and thus a communication connection may not be established even if the electronic device 300 requests a communication connection to the audio output device 100 in operation 1203 or operation 1207. In another embodiment, when the audio output device 100 activates the wireless communication circuit 310 in operation 1209 and operates in the page scan mode, the electronic device 300 may receive a signal requesting a communication connection with the audio output device 100 in operation 1211. In yet another embodiment, when the audio output device 100 responds to the communication connection request received from the electronic device 300, the audio output device 100 may establish a communication connection with the electronic device 300 and transmit information on the charging state.

As described above, according to an embodiment, an audio output device (e.g., the audio output device 100 in FIG. 1) may include a battery, a wireless communication circuit, and a control circuit electrically connected to the battery and the wireless communication circuit, wherein the control circuit, when an electrical connection between the audio output device and a power supply device is detected, releases a communication connection with an electronic device, using the wireless communication circuit, and starts charging of the battery of the audio output device by using the power supplied from the power supply device, and, when either a battery residual capacity of the audio output device or a battery residual capacity of the power supply device satisfies a designated charging condition during charging of the battery of the audio output device, temporarily activates the wireless communication circuit, and transmits information on the charging state of the audio output device or the power supply device to the electronic device through the wireless communication circuit.

According to one embodiment, the control circuit may transmit information on the charging state of the audio output device or the power supply device to the electronic device after establishing a communication connection with the electronic device.

According to another embodiment, the control circuit may transmit information on the charging state of the audio output device or the power supply device to the electronic device and a peripheral electronic device by using an advertising signal without a direct communication connection with the electronic device.

According to yet another embodiment, when a designated time condition is satisfied during charging of the battery of the audio output device, the control circuit may activate the wireless communication circuit, and transmit information on the charging state of the audio output device or the power supply device to the electronic device through the wireless communication circuit.

According to still another embodiment, the information on the charging state may include at least one of battery charge rate information, battery usable time information, information on an elapsed time after charging starts, information on an estimated required time for complete charging, heat state information, charging method information, and charging error information.

The control circuit may receive information on a charging state of a sub audio output device from the sub audio output device paired with the audio output device, and transmit the information on the charging state of the sub audio output device together with the information on the charging state of the audio output device or the power supply device to the electronic device through the wireless communication circuit.

In an embodiment, the control circuit may deactivate the activated wireless communication circuit when a response signal is received from the electronic device within a predetermined time after transmitting the information on the charging state, and transmit the information on the charging state of the audio output device or the power supply device to the electronic device again through the wireless communication circuit when a response signal is not received within the predetermined time after transmitting the information on the charging state.

In another embodiment, the control circuit may transmit information on the charging state to the electronic device such that the information on the charging state of the audio output device or the power supply device is displayed on a display of the electronic device.

As described above, according to an embodiment, a method for transmitting information on a charging state of an audio output device may include, when an electrical connection between the audio output device and a power supply device is detected (e.g., operation 410 in FIG. 4), releasing a communication connection with an electronic device, using a wireless communication circuit, and starting charging a battery of the audio output device by using power supplied from the power supply device (e.g., operation 420 in FIG. 4), and, when either a battery residual capacity of the audio output device or a battery residual capacity of the power supply device satisfies a designated charging condition during charging of the battery of the audio output device (e.g., operations 430 and 440 in FIG. 4), temporarily activating the wireless communication circuit, and transmitting information on a charging state of the audio output device or the power supply device to the electronic device through the wireless communication circuit (e.g., operation 450 in FIG. 4).

According to one embodiment, the transmitting of information on the charging state of the audio output device or the power supply device to the electronic device (e.g., operation 450 in FIG. 4) may include transmitting information on the charging state of the audio output device or the power supply device to the electronic device after establishing a communication connection with the electronic device.

According to another embodiment, the transmitting of information on the charging state of the audio output device or the power supply device to the electronic device (e.g., operation 420 in FIG. 4) may include transmitting information on the charging state of the audio output device or the power supply device to the electronic device and a peripheral electronic device by using an advertising signal without a direct communication connection with the electronic device.

According to yet another embodiment, the activating of the wireless communication circuit (e.g., operation 430 in FIG. 4) may include activating the wireless communication circuit when a designated time condition is satisfied during charging of the battery of the audio output device.

According to still another embodiment, the information on the charging state may include at least one of battery charge rate information, battery usable time information, information on an elapsed time after charging starts, information on an estimated required time for complete charging, heat state information, charging method information, and charging error information.

The transmitting of information on the charging state of the audio output device may further include receiving information on a charging state of a sub audio output device from the sub audio output device paired with the audio output device, and transmitting the information on the charging state of the sub audio output device together with the information on the charging state of the audio output device or the power supply device to the electronic device through the wireless communication circuit.

In an embodiment, the transmitting of information on the charging state of the audio output device may further include deactivating the activated wireless communication circuit when a response signal is received from the electronic device within a predetermined time after transmitting the information on the charging state, and transmitting the information on the charging state of the audio output device or the power supply device to the electronic device again through the wireless communication circuit when a response signal is not received within the predetermined time after transmitting the information on the charging state.

As described above, an embodiment may provide an audio system including an audio output device (e.g., the audio output device 100 in FIG. 1) and a power supply device wherein the audio output device includes a battery, a wireless communication circuit, and a control circuit electrically connected to the battery and the wireless communication circuit, wherein the control circuit, while the audio output device is mounted on the power supply device and the battery of the audio output device is being charged, activates the wireless communication circuit when the charging satisfies a designated time condition or a battery residual capacity of the audio output device or the power supply device satisfies a designated charging condition, transmits information on a charging state of the audio output device or the power supply device to the electronic device through the wireless communication circuit, and deactivates the activated wireless communication circuit after transmitting the information on the charging state.

In an embodiment, the designated time condition may include at least one of a condition for a time during the battery of the audio output device is charged, a condition for a time period in which information on the charging state is transmitted, and a condition for a time zone in which the information on the charging state is transmitted, and the designated charging condition may include at least one of a condition for a charge rate of the battery of the audio output device, a condition for a charge rate of the battery of the audio output device corresponding to a usable time of the audio output device, a condition for a battery residual capacity of the power supply, and a condition for a battery residual capacity of the power supply device corresponding to the number of times for fully charging the battery of the audio output device.

In another embodiment, the designated time condition and the designated charging condition may be conditions preconfigured in the audio system or conditions configured by a user through the electronic device.

In yet another embodiment, the control circuit may activate the wireless communication circuit to establish a Bluetooth communication connection with the electronic device, and transmit information on a charging state of the audio output device or the power supply device to the electronic device.

In still another embodiment, the control circuit may deactivate the activated wireless communication circuit when a response signal is received from the electronic device within a predetermined time after transmitting the information on the charging.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. According to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An audio output device comprising:
a battery;
a wireless communication circuit; and
a control circuit electrically connected to the battery and the wireless communication circuit,
wherein the control circuit is configured to:
in case that an electrical connection between the audio output device and a power supply device is detected:
release a communication connection with an electronic device, using the wireless communication circuit, and
start charging of the battery of the audio output device by using power supplied from the power supply device, and
wherein the control circuit is configured to:
in case that either a battery residual capacity of the audio output device or a battery residual capacity of the power supply device satisfies a designated charging condition during charging of the battery of the audio output device:
activate the wireless communication circuit, and
transmit information on a charging state of the audio output device or the power supply device to the electronic device through the wireless communication circuit.

2. The audio output device of claim 1, wherein the control circuit is further configured to transmit information on the charging state of the audio output device or the power supply device to the electronic device after establishing a communication connection with the electronic device.

3. The audio output device of claim 1, wherein the control circuit is further configured to transmit information on the charging state of the audio output device or the power supply device to the electronic device and a peripheral electronic device by using an advertising signal.

4. The audio output device of claim 1, wherein the control circuit is further configured to, in case that a designated time condition is satisfied during charging of the battery of the audio output device:
activate the wireless communication circuit; and
transmit information on the charging state of the audio output device or the power supply device to the electronic device through the wireless communication circuit.

5. The audio output device of claim 1, wherein the information on the charging state comprises at least one of battery charge rate information, battery usable time information, information on an elapsed time after charging starts, information on an estimated required time for complete charging, heat state information, charging method information, or charging error information.

6. The audio output device of claim 1, wherein the control circuit is further configured to:
receive information on a charging state of a sub audio output device from the sub audio output device paired with the audio output device, and
transmit the information on the charging state of the sub audio output device together with the information on the charging state of the audio output device or the power supply device to the electronic device through the wireless communication circuit.

7. The audio output device of claim 1, wherein the control circuit is further configured to:
deactivate the activated wireless communication circuit in case that a response signal is received from the electronic device within a predetermined time after transmitting the information on the charging state, and
transmit the information on the charging state of the audio output device or the power supply device to the electronic device again through the wireless communication circuit in case that a response signal is not received within the predetermined time after transmitting the information on the charging state.

8. The audio output device of claim 1, wherein the control circuit is further configured to transmit information on the charging state to the electronic device such that the information on the charging state of the audio output device or the power supply device is displayed on a display of the electronic device.

9. A method for transmitting information on a charging state of an audio output device, the method comprising:
in case that an electrical connection between the audio output device and a power supply device is detected:
releasing a communication connection with an electronic device, using a wireless communication circuit; and
starting charging a battery of the audio output device by using power supplied from the power supply device; and
in case that either a battery residual capacity of the audio output device or a battery residual capacity of the power supply device satisfies a designated charging condition during charging of the battery of the audio output device:
temporarily activating the wireless communication circuit; and transmitting information on a charging state of the audio output device or the power supply device to the electronic device through the wireless communication circuit.

10. The method of claim 9, wherein the transmitting of the information on the charging state of the audio output device or the power supply device to the electronic device comprises transmitting information on the charging state of the audio output device or the power supply device to the electronic device after establishing a communication connection with the electronic device.

11. The method of claim 9, wherein the transmitting of the information on the charging state of the audio output device or the power supply device to the electronic device comprises transmitting information on the charging state of the audio output device or the power supply device to the electronic device and a peripheral electronic device by using an advertising signal.

12. The method of claim 9,
wherein the activating of the wireless communication circuit comprises activating the wireless communication circuit in case that a designated time condition is satisfied during charging of the battery of the audio output device, and
wherein the information on the charging state comprises at least one of battery charge rate information, battery usable time information, information on an elapsed time after charging starts, information on an estimated required time for complete charging, heat state information, charging method information, or charging error information.

13. The method of claim 9, further comprising:
receiving information on a charging state of a sub audio output device from the sub audio output device paired with the audio output device; and
transmitting the information on the charging state of the sub audio output device together with the information on the charging state of the audio output device or the power supply device to the electronic device through the wireless communication circuit.

14. The method of claim 9, further comprising:
deactivating the activated wireless communication circuit in case that a response signal is received from the electronic device within a predetermined time after transmitting the information on the charging state; and
transmitting the information on the charging state of the audio output device or the power supply device to the electronic device again through the wireless communication circuit in case that a response signal is not received within the predetermined time after transmitting the information on the charging state.

15. An audio system comprising an audio output device and a power supply device, the audio output device comprising:
a battery;
a wireless communication circuit; and
a control circuit electrically connected to the battery and the wireless communication circuit,
wherein the control circuit is configured to:
while the audio output device is mounted on the power supply device and the battery of the audio output device is being charged, in case that the charging satisfies a designated time condition or a battery residual capacity of the audio output device or the power supply device satisfies a designated charging condition, activate the wireless communication circuit,
transmit information on a charging state of the audio output device or the power supply device to an electronic device through the wireless communication circuit, and
deactivate the activated wireless communication circuit after transmitting the information on the charging state.

* * * * *